United States Patent [19]

Sasaki et al.

[11] Patent Number: 4,829,341

[45] Date of Patent: May 9, 1989

[54] DOCUMENT FEEDING APPARATUS WITH IMAGE AREA DESIGNATION DEVICE

[75] Inventors: Nobukazu Sasaki, Tokyo; Toshiro Kasamura, Yokohama; Atsushi Kubota; Toshihiko Kusumoto, both of Tokyo; Tatsuya Shiratori, Yokohama; Takashi Ozawa, Ichikawa; Yasuyoshi Yamamoto, Tokyo; Michiro Koike, Kawasaki; Masashi Ohashi; Akiyoshi Kimura, both of Tokyo, all of Japan

[73] Assignee: Canon Kabushiki Kaisha, Tokyo, Japan

[21] Appl. No.: 224,234

[22] Filed: Jul. 25, 1988

Related U.S. Application Data

[63] Continuation of Ser. No. 895,031, Aug. 8, 1986, abandoned.

[30] Foreign Application Priority Data

| | | | |
|---|---|---|---|
| Aug. 9, 1985 | [JP] | Japan | 60-175466 |
| Aug. 9, 1985 | [JP] | Japan | 60-175467 |
| Aug. 9, 1985 | [JP] | Japan | 60-175468 |
| Aug. 9, 1985 | [JP] | Japan | 60-175469 |
| Aug. 9, 1985 | [JP] | Japan | 60-175470 |
| Aug. 9, 1985 | [JP] | Japan | 60-175471 |
| Aug. 30, 1985 | [JP] | Japan | 60-191417 |
| Aug. 30, 1985 | [JP] | Japan | 60-191419 |

[51] Int. Cl.$^{4}$ ....................... G03G 15/00; G03B 27/62

[52] U.S. Cl. ....................................... 355/75; 355/313; 355/317; 355/230; 271/258; 271/265

[58] Field of Search .............. 355/75, 7, 3 SH, 14 SH, 355/3 R; 271/258, 265

[56] References Cited

U.S. PATENT DOCUMENTS

| | | | |
|---|---|---|---|
| 4,256,400 | 3/1981 | Komori et al. | 355/14 SH |
| 4,610,533 | 9/1986 | Takahata | 355/14 SH |
| 4,611,904 | 9/1986 | Wada | 355/14 SH |
| 4,660,957 | 4/1987 | Ueda et al. | 355/3 SH |

FOREIGN PATENT DOCUMENTS

| | | |
|---|---|---|
| 81865 | 7/1981 | Japan . |
| 204066 | 4/1982 | Japan . |

OTHER PUBLICATIONS

IBM Technical Disclosure Bulletin, vol. 14, No. 5, p. 1547, Oct. 1971.

*Primary Examiner*—R. L. Moses

*Attorney, Agent, or Firm*—Fitzpatrick, Cella, Harper & Scinto

[57] ABSTRACT

A document feeding apparatus comprises a first original supporting device on which an original is placed, an original inlet port for receiving the original placed on the first original supporting device, a conveying device for guiding the original fed from the inlet port to a predetermined position and exhausting the original from the predetermined position, and a second original supporting device mounted on a housing of the document feeding apparatus and having an image area designation device for designating an image area of the original. In an image area designation mode of the apparatus, the original is placed on the image area designation device, a desired image area is designated, and the original is placed on the first original supporting device and is guided to the predetermined position through the inlet port.

40 Claims, 23 Drawing Sheets

DOCUMENT FEEDING APPARATUS WITH IMAGE AREA DESIGNATION DEVICE

This application is a continuation of application Ser. No. 895,031 filed Aug. 8, 1986, now abandoned.

BACKGROUND OF THE INVENTION

1. Field of the Invention

The present invention relates to a document feeding apparatus and, more particularly, to a document feeding apparatus used in image forming equipment such as a copying machine and an information recording device.

In particular, the present invention relates to a document feeding apparatus for image forming equipment, which has an image area designation function, automatically aligns a document or original on an original exposure table (platen), and exhausts a copied sheet.

A document feeding apparatus and an image area designation device (to be referred to as a digitizer hereinafter) which are used in a copying machine will be exemplified.

2. Related Background Art

In a conventional copying machine, in order to copy an original, an operator places the original on an original table (e.g., platen glass). In copying of a plurality of original sheets, a document feeder has been recently proposed and used in practice to automatically feed original sheets and copy them since it is inconvenient to manually place original sheets on the original table one by one.

FIG. 1 is a sectional view showing a typical example of a conventional automatic sheet document feeder. Referring to FIG. 1, original sheets 2 are stacked on an original feed tray 1. In this case, the upper surfaces (i.e., image surfaces) of the original sheets face down in FIG. 1. A pickup roller 3 is made of a material such as a rubber-based material having a large friction coefficient and swings about a feed roller shaft 10. A feed roller 5 (made of the same material as that of the pickup roller 3) is fixed to the feed roller shaft 10. The feed roller 5 is rotated upon rotation of the feed roller shaft 10. This rotational force is transmitted to the pickup roller 3 through a gear (not shown). The rotational direction of the feed roller 5 is the same as that of the pickup roller 3. At the same time, the peripheral velocity of the feed roller 5 is the same as that of the pickup roller 3. A rotating shaft (not shown) of a first paper feed roller 4 is fixed to the paper feed tray 1. When the original sheet 2 is inserted between the pickup roller 3 and the first paper feed roller 4 and the pickup roller 3 urges the original sheet, the roller 4 is driven.

A second paper feed roller 6 slidably urges the sheet against the roller shaft 10. When the original sheet passes between the feed roller 5 and the second feed roller 6, the second paper feed roller 6 is driven. A pickup arm 8 pivots about a pickup arm shaft 7 as a pivot shaft and has a U-shaped groove 9*a* at its one end. A shaft 9*b* fixed to a paper feed arm 9 pivotal about the feed roller shaft 10 as the pivot shaft is fitted in the U-shaped groove 9*a* of the pickup arm 8. If the pickup arm shaft 7 is pivoted counterclockwise (as viewed), the pickup arm 8 is pivoted counterclockwise and the paper feed arm 9 is also pivoted counterclockwise about the feed roller shaft 10. At this time, the pickup roller 3 is separated from the first paper feed roller 4. If the pickup arm shaft 7 is then pivoted clockwise, the pickup arm 8 is pivoted in the same direction. The paper feed arm 9 is also pivoted clockwise about the feed roller shaft 10. Therefore, the pickup roller 3 having separated from the first paper feed roller 4 is brought into tight contact with the first paper feed roller 4. If an original sheet 2 is present, it is clamped and can be fed between the pickup roller 3 and the first paper feed roller 4.

An original sensor 11 comprises a reflection sensor for detecting the presence/absence of an original sheet. A leading end sensor 12 comprises a reflection sensor for detecting the leading end of the original sheet.

A wide belt 15 comprises an endless belt which has a width covering the entire surface of the original sheet. The belt 15 is covered with a rubber-based material having a high friction coefficient sufficient to feed the original with the friction force. The surface of the coating on the belt 15 is treated such that contamination can be removed therefrom by alcohol or the like. The belt 15 is looped between a driving roller 13 and a turn roller 19. The turn roller 19 is designed such that a shaft 19*a* is biased to the left in FIG. 1 so as to keep the belt 15 taut and prevent the belt 15 from sliding slid with respect to the driving roller 13. The driving roller 13 has a driving shaft 14. Press rollers 16, 17 and 18 are in rolling contact with the inner surface of the belt 15. Each of the distances between the feed roller 5 and the press roller 16, between the press rollers 16 and 17, between the press rollers 17 and 18, and between the press roller 18 and an exhaust roller 20 is slightly narrower than the size of original sheets which can be fed. The roller 16, 17 and 18 urge the belt 15 with a small pressure against an original platen glass 47 on the copying machine housing. When the original sheet 2 passes between the original platen glass 47 and the belt 15, a feeding force is increased.

The automatic document feeding apparatus also includes an exhaust sensor 22 for detecting exhaustion of a sheet original If the original is not detected within a predetermined period of time, a jam lamp (not shown) is turned on.

Exhaust rollers 20 and 50 are biased by exhaust rollers 21 and 51, respectively. The original sheet is clamped between the exhaust rollers 20 and 21 and between the exhaust rollers 50 and 51 after copying is completed. The original sheet is then discharged on an exhaust tray 61. The exhaust rollers 20 and 50 are rotated by a driving belt 49, and the exhaust rollers 21 and 51 are driven upon feeding of the original sheet. The roller 51 is rotatably mounted on an exhaust roller shaft 51*a*.

Referring to FIG. 2, a driving gear 42 is fixed on a rotating shaft 43*a* of a motor 43. A motor rotational force is transmitted from the driving gear 42 to a gear 40 through an idler gear 41. Rotation of the gear 40 is transmitted to a clutch shaft 44 upon on/off operation of an electromagnetic clutch 35. Upon energization of the electromagnetic clutch 35, the rotational force of the gear 40 is transmitted to the clutch shaft 44. An electromagnetic brake 34 stops rotating the clutch shaft 44. Upon energization of the electromagnetic brake 34, the clutch shaft 44 is stopped. A gear 36 is fixed to the clutch shaft 44. When the clutch 44 is rotated, the gear 36 is also rotated to transmit the rotational force to a clock disc gear 37 so that the rotational speed is increased and a clock disc 38 is rotated at the increased rotational speed. The clock disc 38 has many slots on its peripheral portion. The number of grooves is read by a photointerruptor 39. The rotational force of the clutch shaft 44 is transmitted to a driving roller shaft 14 by a belt 32 looped between a driving pulley 33 fixed to the clutch shaft 44 and a driven pulley 31 fixed to the driving roller shaft 14. A pulley (large) 25 is mounted on the driving roller shaft 14 through a spring clutch (not shown). A plunger 27 controls a spring clutch control ring 26 through a clutch ratchet 28, thereby transmitting or stopping transmitting the driving force. A pulley (small) 23 receives a rotational force of the pulley (large) 25 through a belt 24 and is coupled to the feed roller shaft 10 through a one-way clutch (not shown).

The ratio of the diameter of the pulley (large) 25 to that of the pulley (small) 23 is selected such that the peripheral velocity of the belt 15 is slightly faster than that of the feed roller 5. When the original sheet 2 is caught by the belt 15 and is fed at the same speed as that of the belt 15, the pulley (small) 23 is coupled to the roller shaft 10 through the one-way clutch such that the feed roller 5 follows the original sheet 2. It should be noted that the feed roller 5 and the pickup roller 3 are coupled through a gear mechanism such that they have the same rotational direction and the same peripheral velocity. A plunger 30 causes the paper feed roller shaft 9 to pivot through a lever 29, thereby vertically moving the pickup roller 3.

The operation of the automatic document feeder with the above arrangement will be described hereinafter.

The original sheets 2 are placed on the paper feed tray 1 and one original sheet 2 is inserted between the pickup roller 3 and the paper feed roller 4. The original sensor 11 detects the presence of the original sheet 2. When a predetermined period of time has elapsed, the plunger 30 is energized to move the pickup roller 3 downward, thereby causing the pickup roller 3 and the paper feed roller 4 to clamp the original therebetween (when the original sheet is not detected, the pickup roller 3 is kept in the upper position). At the same time, the motor 43 is rotated and the clutch 35 is energized to rotate the driving roller 13. In this state, the plunger 27 is not energized, and the pulley (large) 25 is stopped by a spring clutch (not shown). Therefore, the original sheet is not fed. When a predetermined period of time has elapsed upon rotation of the motor 43, the plunger 30 is energized and the clutch ratchet 28 is separated from the control ring 26. The driving shaft 14 is rotated and its rotational force is transmitted to the feed roller shaft 10 to start rotating the feed roller 5 and the pickup roller 3. In this state, the original sheet 2 starts to be fed. When the distal end of the original sheet 2 passes between the feed roller 5 and the second paper feed roller 6, the distal end of the sheet 2 is detected by the distal end sensor 12. From this timing, the photointerruptor 39 starts counting the clocks of the clock disc 38. The original sheet 2 is inserted between the belt 15 and the original platen glass 47. When the distal end of the original sheet 2 is located below the press roller 16, the feeding force of the belt 15 is increased so that the peripheral velocity of the original sheet 2 is the same as that of the belt 15 and is faster than that of the feed roller 5. The feed roller 5 is driven upon movement of the original sheet 2. When the trailing end of the original sheet 2 is detected by the paper sensor 11, the plunger 30 is deenergized and the pickup roller 3 is moved upward. The trailing end of the original sheet 2 is detected by the distal end sensor 12, and at the same time the plunger 27 is deenergized. The feed roller 5 and the pickup roller 3 are stopped. This is not to accept the next original sheet.

When the distal end of the original sheet is detected by the distal end sensor 12 and the photointerruptor 39 counts the predetermined number of clocks, the motor 43 is deenergized. At the same time, the clutch 35 is deenergized. The brake 34 is then energized to immediately stop the clutch shaft 44. Rotation of the driving shaft 14 and then that of the belt 15 is stopped. The original sheet 2 is stopped at a predetermined position of the original platen glass 47. Energization of the brake 34 is interrupted after the lapse of a predetermined period of time. As soon as the brake 34 is deenergized, a copy start signal is supplied to the copying machine to start copying. The exposure operation of the copying machine is thus started.

The motor 43 starts rotating in response to a copy end signal. The clutch 35 is energized to cause the belt 15 to exhaust the original sheet 2. The original sheet is inserted between the exhaust rollers 20 and 21 and between the exhaust rollers 50 and 51. The original sheet 2 is exhausted onto the exhaust tray 61. When the original sensor 11 detects the presence of the original sheet, the plunger 27 is energized after the exhaust sensor 22 detects the leading end of the original sheet 2. The original sheet is fed in the same procedures as described above.

A driving force of the sheet exhaust section is transmitted from a gear 48 fixed to the turn roller 19 to a gear 46 through an idler gear 45. The gear 46 is fixed to an exhaust roller shaft **20*a* so that the shaft 20*a* and the gear 46 are rotated together. A pulley 20*b* is fixed to the exhaust roller shaft 20*a*, and the rotational force is transmitted to a pulley 52*a* fixed to a shaft 52 through a belt 49**.

While the belt 15 is being driven, the exhaust rollers 21 and 51 in the original exhaust section receive the driving force.

It should be noted that if an original such as a book is to be copied, the automatic document feeder is opened/closed to place the book on the platen glass 47.

In addition to the automatic document feeder described above, other multifunction devices with new functions are often combined with a copying machine in recent years.

A double copying function is one of the new functions. Different original images are formed on one side of transfer sheet. Assume that one original has an image at a given portion thereof, and that the other original has an image at a portion different from the given portion. The image of one original is formed on a given surface of the transfer sheet and then the image of the other original is then formed thereon, so that the different images are formed on one surface of the transfer sheet, thereby achieving double copying.

Double copying can be performed in a conventional copying machine. After a transfer sheet having an image of one original is exhausted outside the copying machine, the same sheet is fed in the copying machine through a manual feed tray to perform second copying. On the other hand, in a recent conventional copying machine, if a double copying is selected on an operation panel, the transfer sheet is automatically circulated to perform double copying for different originals. Another improved conventional copying machine is also proposed. According to this copying machine, when the operator simply places different originals (e.g., two originals) on the original table, selection of double copying allows automatic double copying even if the original is not manually replaced with the next original.

Another new function is a multicolor copying machine. In this copying machine, a color (e.g., red or blue) developing unit is used in place of the normal black toner developing unit to obtain a multicolor copy. For this purpose, the black toner developing unit is replaced with another color toner developing unit. A plurality of color toner developing units in addition to the black toner developing unit are accommodated in a most advanced existing copying machine. If the operator specifies a desired color on the operation panel, a multicolor image can be automatically obtained.

If the double copying and multicolor copying functions are combined, improved multifunctional features can be designed. In this case, if double copying and multicolor copying functions are selected at the same time, a multicolor image as a combination of images of the different originals is automatically formed on one surface of a single transfer sheet. In addition, the image of one original may be copied in black, the image of other original may be copied in a color different from black, and the black and another color images are formed on the same surface of the single transfer sheet.

Still another function is an image area designation function. According to this function, a necessary image area is extracted from a single original image, and only the extracted image is copied. For this purpose, a desired image area is measured by X and Y values. These values are input at the operation panel The light-emitting array arranged near a photosensitive body for forming an image is locally and time-serially turned on in response to the input signals, and the latent image of the unnecessary area on the photosensitive body is erased, thereby obtaining only the image of the desired area.

In a copying machine with an image area designation function, the image area is designated by using a coordinate detection element (a so-called digitizer). When the operator places an original on a digitizer and depresses the necessary image area, the desired image area is automatically detected. In this case, the above-mentioned measurement need not be performed, resulting in convenience.

If all the double copying, multicolor copying, and image area designation functions are combined, further improved multifunctional features can be designed. If the double copying operation described above is performed, the positions of the images of the originals must be different. For this purpose, the originals having images at different locations must be selected. However, if the area designation function is used together with the double copying function, the image areas which will cause overlapping of images can be erased to widen selection of the types of originals for double copying. Therefore, by combining the three functions, double copying and multicolor imaging can be performed regardless of the types of originals.

FIG. 3 shows a conventional copying machine with a digitizer and a document feeder. The manipulation procedures of the copying machine will be described hereinafter.

The operator places a desired original 112 on a digitizer 101 such that the image surface of the original 112 faces upward, that the right end of the original abuts against an original abutment (not shown), and that the rear side (the lower surface in FIG. 3) of the original 112 abuts against an abutment (not shown). The operator inputs a desired area of the original surface with a stylus pen 113. Various digitizer input and detection schemes have been proposed and a detailed description thereof will be omitted. When the input operation is completed, the operator designates with function keys $\mathbf{114}_1$, $\mathbf{114}_2$, . . . and $\mathbf{114}_n$ whether the designated area image is reproduced or whether different colors are designated. In this manner, the operator sets a desired mode or a combination of modes. Signals input at the digitizer 101 and the function keys $\mathbf{114}_1$ to $\mathbf{114}_n$ are sent to the copying machine housing through a signal lines 115.

Subsequently, the operator places the original 112 at a predetermined position (not shown) on the original feed tray 1 of the document feeder such that the image surface of the original 112 faces downward. The operation of the automatic document feeder has been described above, and its description will not be repeated. By these operations, the operator obtains a desired image, i.e., an image of the designated area, an image of the area excluding the designated area, a colored image of the designated area.

Typical multifunctional features in recent copying machines have been described above. However, copying machines with these functions are not conveniently used yet for the following reason.

In the conventional copying machines of this type, the digitizer is located on a copying machine where copying operation is not interfered, or outside the copying machine. In addition, since the digitizer has a size larger than original sizes which can be copied, the location of the digitizer is limited.

In particular, if the digitizer is located outside the copying machine, the operator must perform many operation procedures.

More specifically, the operator must place the original to allow the original end to abut against the corresponding abutment and this operation is inconvenient. In addition, when an image area designation error occurs, area designation must be performed again from the beginning to result in cumbersome, time-consuming manipulation.

SUMMARY OF THE INVENTION

It is a principal object of the present invention, in consideration of the conventional drawback, to provide a convenient automatic document feeding apparatus with an image area designation device, wherein multifunctional features of an image forming system can be easily utilized by simple operation.

It is another object of the present invention to provide a document feeding apparatus with an image area designation device, wherein original feeding manipulation can be simplified.

It is still another object of the present invention to provide a document feeding apparatus with an image area designation device, wherein the image area designation device can be sufficiently protected.

It is still another object of the present invention to provide a document feeding apparatus with an image area designation device, wherein processing of a plurality of originals can be simplified.

It is still another object of the present invention to provide a document feeding apparatus with an image area designation device, wherein an original whose image area is designated by the image area designation device can be automatically fed to a predetermined position.

It is still another object of the present invention to provide a document feeding apparatus with an image area designation device, wherein an original can be easily placed on the image area designation device in association with a sheet material (e.g., transfer paper).

A document feeding apparatus according to the present invention is combined with an image area designation device with respect to the copying machine housing. The automatic document feeding apparatus has no installation limitations. In addition, there are no limitations as to the position of the operator, thus guaranteeing easy operations and eliminating operation errors.

In the automatic document feeding apparatus according to the present invention, the image area designation device is located above an original feeding means so that the operator can perform manipulation near a predetermined position. Therefore, the operator can easily and accurately locate in position the original whose image area has been designated by the image area designation device.

In addition, the original which does not require image area designation on the image area designation device can be fed to a predetermined position through another original table means different from the original table means with the image area designation device. Therefore, the original can be fed at high speed.

Furthermore, the original is fed to the predetermined position through the feeding means after the image area of the original is designated, thereby improving operability.

Furthermore, there are provided a feed port at the end of the original table means with the image area designation device and a feed path for feeding the original to the predetermined position. After the operator inputs a desired image area on the image area designation device, he simply inserts the original into the original feed port so that the original is set to the predetermined position on the original platen glass, thereby obtaining a desired copy. With the arrangement according to the present invention, there is no fear of causing the operator to misjudge the reference sides which are the front and rear sides along the right-and-left direction of the original.

Furthermore, since there is provided a feeding means such as an original feed roller pair, an original of a small size can be fed. Ramp and jam for originals of other sizes can be greatly eliminated.

Furthermore, the original reference (perpendicular to the original feed direction) on the image area designation device is defined to be the original feed direction, i.e., the side of the original feed port. The feed distance of the original to the original feed port can be minimized, and at the same time original feeding can be simplified.

In the case of designating image areas of a plurality of originals, the originals usually have sizes smaller than a maximum original size. For this reason, even if the original processed and fed to the predetermined position is exhausted on the image area designation device again, it is exhausted at a position away from the original reference of the image area designation device, and processing of the next original is not interfered.

Even if an original is fed from the original feed port near the image area designation device, many devices and means (e.g., an original feeding system represented by the original leading end sensor and the conveyor belt, and control means for controlling original feeding) required for processing the original can be commonly used, thereby simplifying the overall configuration of the apparatus.

Furthermore, there is provided a means for protecting the image area designation device. The image area designation device can be protected from damage caused by accidental impact and from dust such as paper dust. In addition, the original is exhausted onto the protecting means to smoothly exhaust the original, thereby properly placing the original. If the protecting means can be opened/closed in use of the image area designation device, the protecting means can be moved away to a position where the means does not interfere with the operation of the image area designation device, thus providing good operability.

Furthermore, the automatic document feeding apparatus comprises first original table means for receiving an original thereon, feeding means for feeding the original from the first original table means, conveying means for conveying the original fed by the feeding means to a predetermined position and thereafter exhausting the original from the predetermined position, second original table means located above the conveying means and having an image area designation device for designating an image area of the original, a first exhaust path for guiding the original exhausted from the predetermined position to the second original table means, a second exhaust path for guiding the original exhausted from the predetermined position to a portion excluding the second original table means, and switching means for guiding the original to the first exhaust path when the image area designation means is not used and to the second exhaust path when the image area designation means is used. With this arrangement, even if a plurality of originals are copied using the image area designation device, the operator need not touch the processed originals, thus simplifying the copying operation. The operator can concentrate on a complicated manipulation such as image area designation, so that copies can be obtained with little possibility of operation errors.

Furthermore, the image area designation device is below the lower surface of the conveyor belt means, so that the image area designation device can be protected by the conveyor belt means without providing a separate protecting means. When the conveyor belt means is pivoted after image area designation is completed, the original can be automatically guided to the predetermined position, thus improving operability.

Furthermore, the original feed direction is perpendicular to the transfer paper (e.g., a sheet) convey direction. Therefore, operability of the automatic document feeding apparatus with the image area designation device can be greatly improved.

DESCRIPTION OF THE PREFERRED EMBODIMENTS

The present invention will be described in detail with reference to the preferred embodiments in conjunction with the accompanying drawings.

Figure 4:
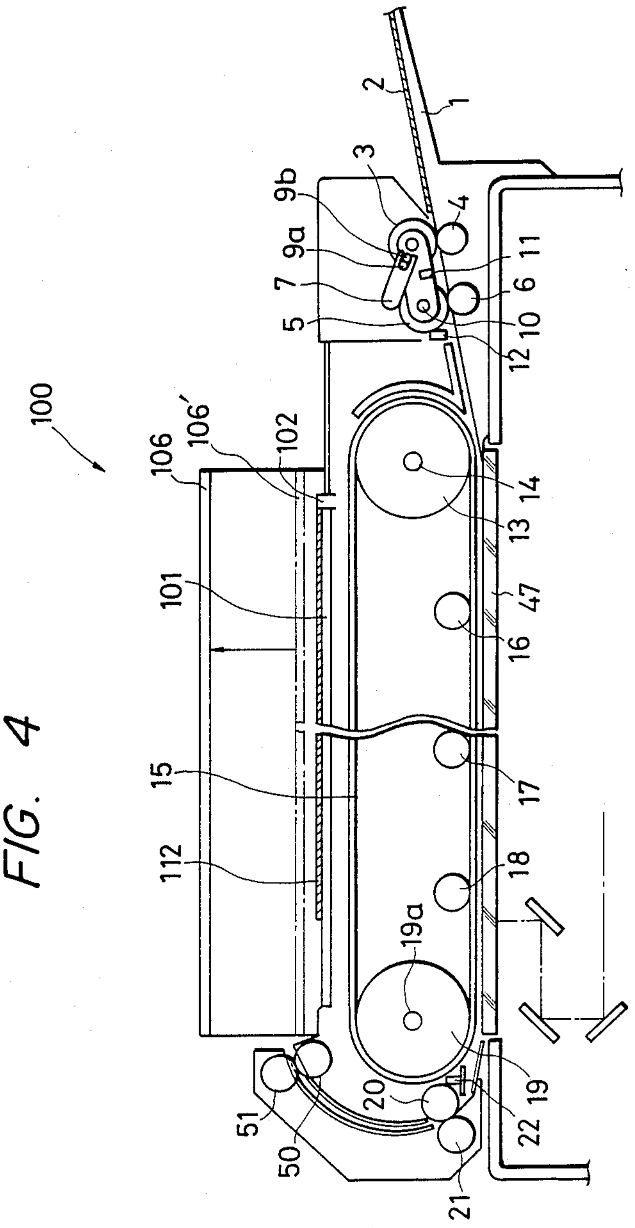
FIG. 4 is a sectional view of a document feeding apparatus according to an embodiment of the present invention.

FIG. 4 is a sectional view showing a document feeding apparatus 100 with a digitizer according to an embodiment of the present invention. The same reference numerals as in FIG. 1 denote the same parts in FIG. 4, and a detailed description thereof will be omitted.

A digitizer 101 serves as an image area designation device on which an original is placed such that its image surface faces upward. An operator inputs a desired image area with a stylus pen or the like. An original is placed on a reference abutment 102. The reference abutment 102 is perpendicular to the original feed direction. A cover 106 (protecting means) is provided on the upper surface of the digitizer 101 and can be moved away from the upper surface thereof. If originals are fed by the automatic document feeding apparatus with a digitizer of this embodiment, the originals exhausted by exhaust rollers 20 and 50 are placed on the upper surface of the cover 106.

Figure 2:
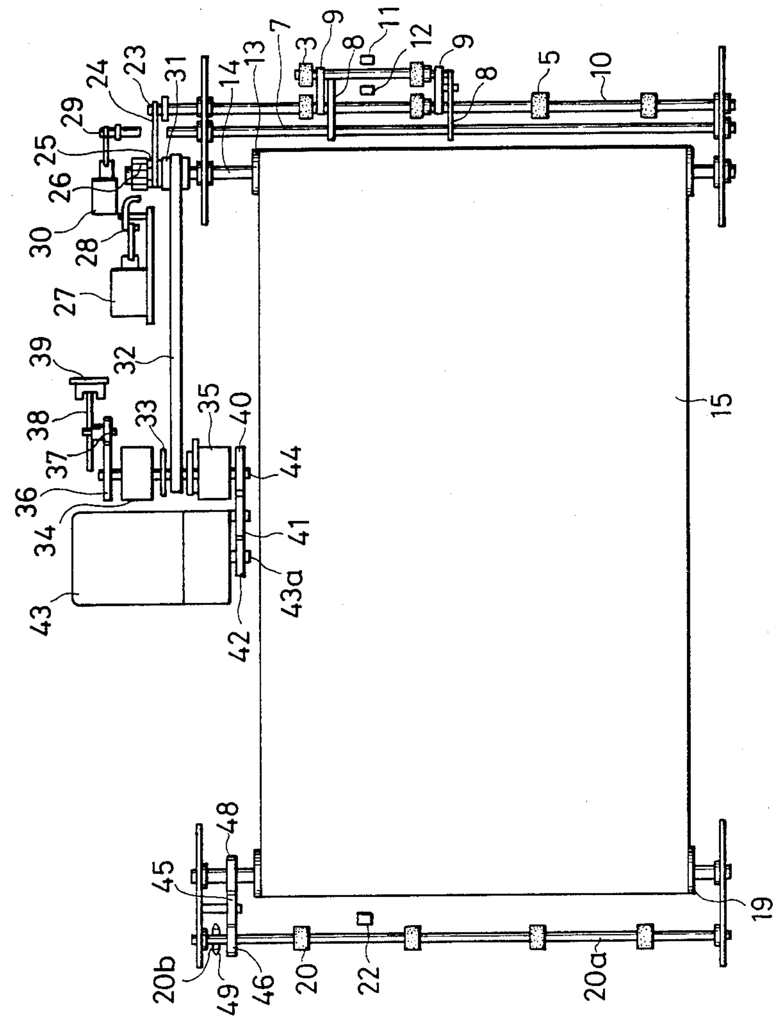
FIG. 2 PRIOR ART
FIG. 2 is a plan view of a drive section in FIG. 1.

The drive section of the apparatus is substantially the same as that in FIG. 2, and a detailed description thereof will be omitted.

Figure 1:
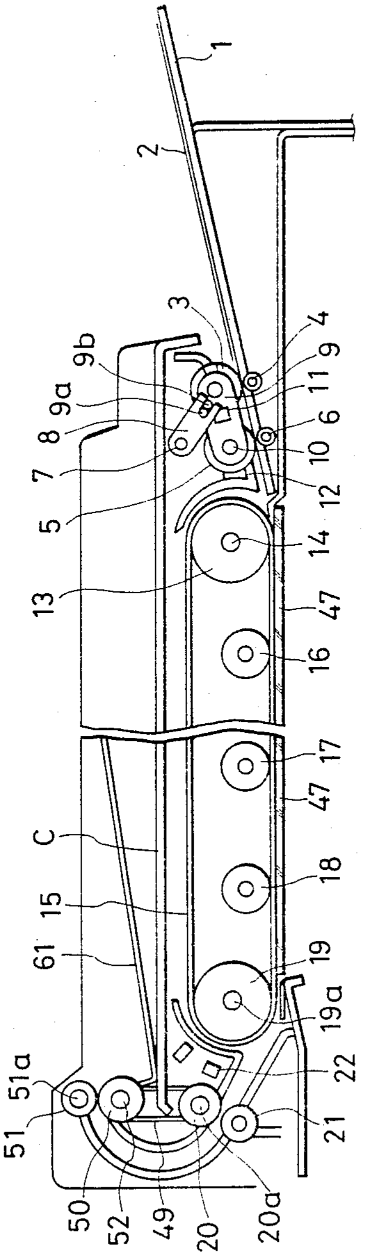
FIG. 1 PRIOR ART
FIG. 1 is a sectional view of a conventional automatic document feeder to which the present invention is to be applied.

The operation of the automatic document feeding apparatus with a digitizer is the same as that in FIGS. 1 and 2, except for the following operations.

A motor 43 is started in response to a copy end signal from a copying machine housing, and an electronmagnetic clutch 35 is energized to cause a belt 15 to exhaust an original sheet 2. The original sheet 2 is clamped between exhaust rollers 20 and 21 and exhaust rollers 50 and 51 and is then exhausted onto the cover 106.

The manipulation of image area designation using this apparatus will be described hereinafter.

The operator opens the cover 106 of the apparatus and places a desired original 112 on the digitizer 101, such that the image surface faces upward. The The operator then brings the right end of the original into abutment with original abutment 102 and the rear side (the lower surface of FIG. 4) of the original 112 into abutment with another abutment (not shown). The operator inputs a desired image area on the original surface. Many conventional input schemes for the digitizer have been proposed, and a detailed description thereof will be omitted. When the input operation is completed, the operator sets a mode with function keys (not shown) so as to determine whether the designated area image is copied. The operator turns the original 112 and inserts the original 112 and from its side having brought into abutment with the original abutment 102 from a position on a paper feed tray 1 into a position between a pickup roller 3 and a first paper feed roller 4. As previously mentioned, the original 112 is automatically fed onto the original plate glass, and the copying operation is started. Only the image of the designated area is copied, or only a portion excluding the designated image area is copied, thus obtaining a desired copy.

Figure 5:
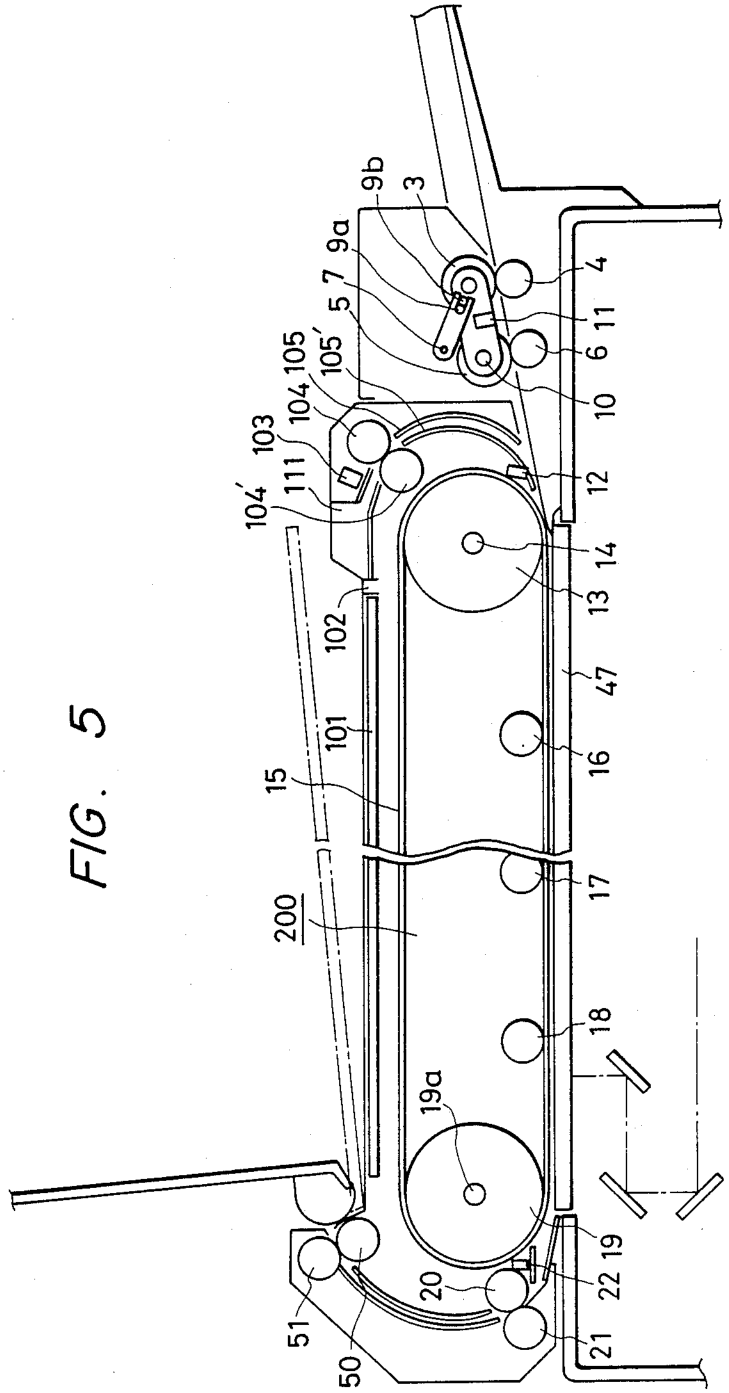
FIG. 5 is a sectional view of a document feeding apparatus according to another embodiment of the present invention.

An embodiment of a document feeding apparatus 200 arranged near a second original convey port near the upper surface of the digitizer is shown in FIG. 5.

Referring to FIG. 5, an original convey port 111 is used to insert the original 112 whose image area designation is completed. An original sensor 103 is arranged near the original convey port 102 to detect the presence/absence of the original 112.

A pair of rollers 104 and 104′ convey th original, and guide plates 105 and 105′ constitute a convey path for guiding the original onto the platen glass.

Figure 6:
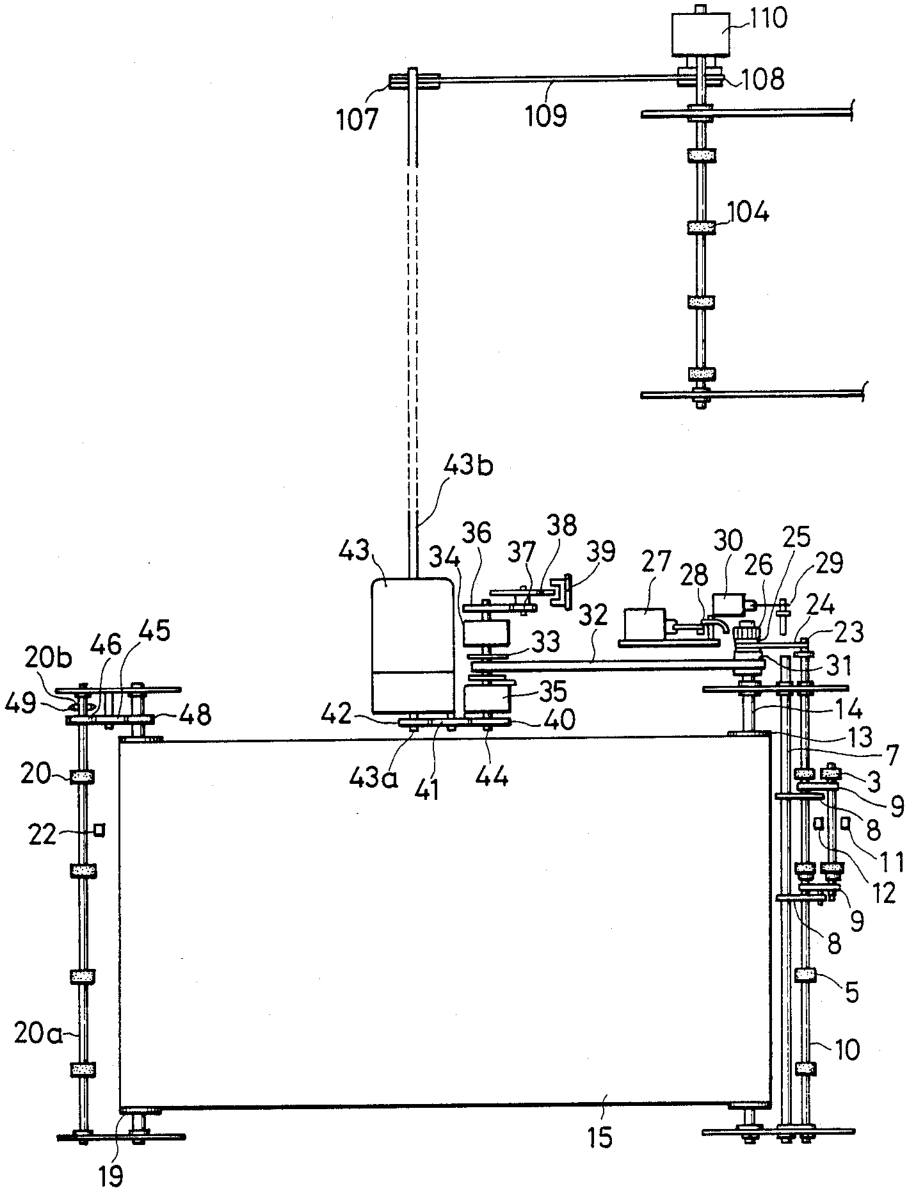
FIG. 6 is a plan view of a drive section in FIG. 5.

A drive section of the above embodiment is shown in FIG. 6.

A pulley 107 is fixed to a motor shaft 43*b*. An electromagnetic clutch 110 is adapted to start or stop rotating the roller 104. A pulley 108 is fixed to the input side of the electromagnetic clutch 110. A rubber belt 109 is looped between the pulleys 107 and 108 and is kept taut with a predetermined tension force. The rubber belt 109 transmits the driving force of the motor 43 to the electromagnetic clutch 110. The roller 104 is fixed to the output side of the electromagnetic clutch 110.

The operation of the apparatus of the above embodiment will be described below. As previously mentioned, the operator inputs a desired image area on the original at the digitizer and sets a desired mode. Subsequently, the operator inserts the original into the original convey port 111 until it abuts against an abutment portion between the rollers 104 and 104′. In this state, the original sensor 103 detects the presence of the original. When a predetermined period of time has elapsed, the motor 43 is started and the clutch 35 is energized. A driving roller 13 is thus rotated. However, a plunger 27 and the electromagnetic clutch 110 are not energized yet. A pulley (large) 25 is stopped by a spring clutch (not shown), and the original sheet is not fed.

When a predetermined period of time has elapsed, the electromagnetic clutch 110 is energized to rotate the roller 104, and the original 112 is conveyed. The original 112 is conveyed along the guide plates 105 and 105'. When the distal end of the original is detected by a leading end sensor 12, a photointerruptor 39 starts counting the clocks of a clock disc 38. The original 112 is then inserted between the belt 15 and an original platen glass 47 conveyed.

When the distal end sensor 12 detects the distal end of the original and the photointerruptor 39 counts a predetermined number of clocks, the motor 43 and the clutch 35 are simultaneously deenergized. At the same time, an electromagnetic brake 34 is energized to instantaneously stop a clutch shaft 44. Upon stopping of a driving shaft 14, the belt 15 is stopped. The original sheet 112 is stopped at the predetermined position of the platen glass 47. Energization of the brake 34 is disabled after the lapse of a predetermined period. As soon as the brake 34 is deenergized, a copy start signal is sent to the copying machine, and copying is started. Therefore, exposure operation in the copying machine is started.

The motor 43 is rotated in response to the copy end signal, and the clutch 35 is energized. The belt 15 starts exhausting the original sheet 112. The original sheet 112 is clamped between the exhaust roller 20 and 21 and the exhaust rollers 50 and 51. The original sheet 112 is then exhausted on the cover 106 which has already been closed. If the original sensor 103 detects the next original, the plunger 27 is energized after the exhaust sensor 22 detects the distal end of the original 112, so that the next original is fed in the same manner as described above.

The subsequent operations of the drive section are the same as that described above, and a detailed description thereof will be omitted.

The digitizer is arranged on the upper surface of the conventional automatic document feeding apparatus, and there are provided a first conveying means for conveying the original from the tray 1 onto the original platen glass, a second conveying path for U-turning the original 112 near the upper surface of the digitizer and for conveying the original 112 midway along the first conveying means, and the roller pair (104 and 104'). Therefore, by using the automatic document feeding apparatus with a digitizer, the following advantages can be obtained.

First, by using the apparatus of this apparatus, the complicated operation for placing sheet originals, closing the cover, and then depressing the start key in normal sheet copying can be eliminated, thus preserving the advantage of the conventional automatic document feeding apparatus.

Second, since the apparatus is equipped with a coordinate position detection device (i.e., a digitizer), a complicated coordinate input operation with ten keys can be replaced with simple stylus pen input operation.

Figure 3:
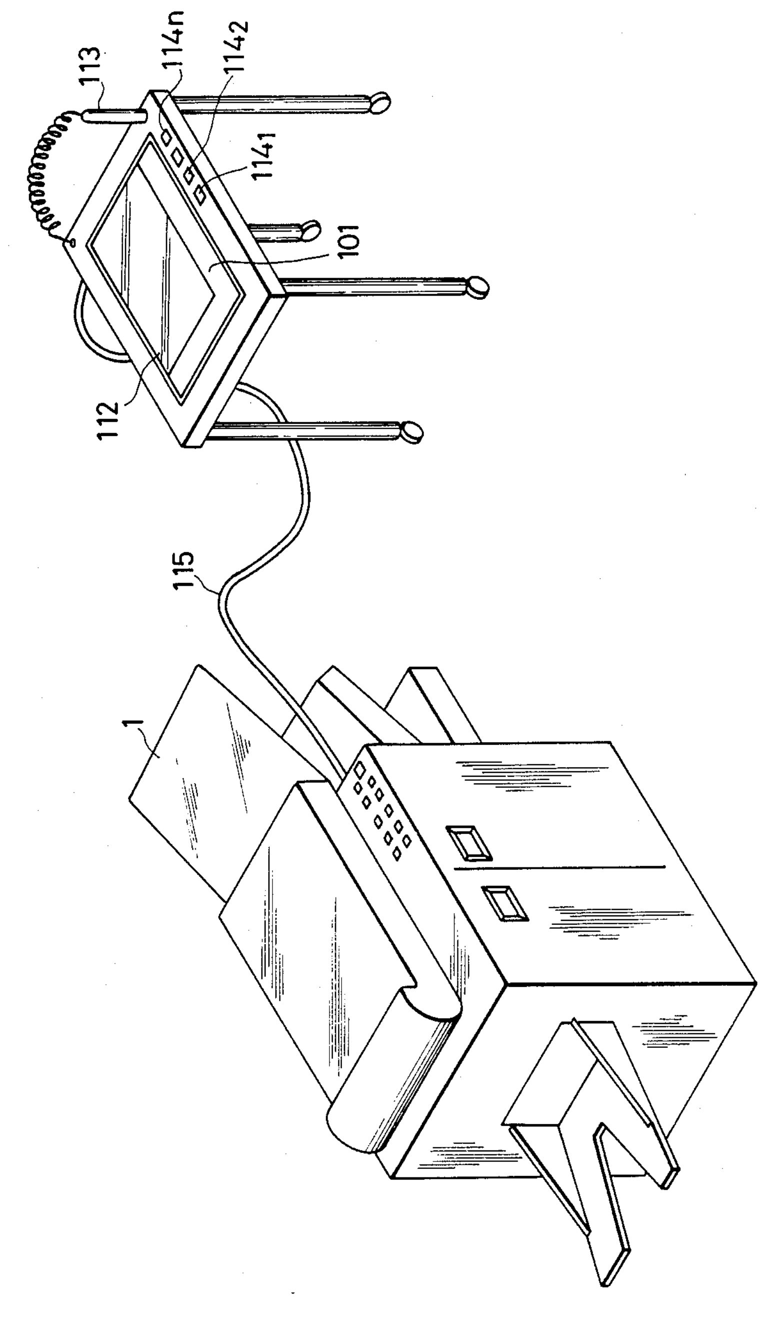
FIG. 3 PRIOR ART
FIG. 3 is a perspective view of a copying machine with a conventional digitizer.

Third, in the arrangement (prior art) described with reference to FIG. 3, after image area designation is completed, the operator must turn the original along the insertion direction of the original and must place it on the tray 1. However, in the embodiment described with reference to FIG. 5, after the operator inputs a desired image area on the digitizer 101, he simply inserts it into the original convey port 111 until it abuts against the rollers 104 and 104'. The original 112 can then be automatically fed onto the original platen glass, and a desired copy can be obtained. With this arrangement (FIG. 5), the original need not be turned and moved to the tray 1. In addition, the possibility of the operator misjudging the front and rear reference sides of the original along the right-and-left direction is eliminated, thus preventing wasteful copying.

Fourth, since the automatic document feeding apparatus is integrally combined with the digitizer with respect to the copying machine housing, there are no limitations on the installation place of these auxiliary devices. In addition, there are no limitations on the manipulation position for the operator, thus improving operability and eliminating the manipulation errors.

In this specification, the automatic document feeding apparatus is exemplified by a DF (Document Feeder) for feeding originals one by one, with a digitizer. The present invention may also be applied to a so-called ADF (Automatic Document Feeder) with a digitizer within the spirit and scope of the present invention.

Reference alignment on the digitizer will be described with reference to FIGS. 7 and 8.

Figure 8:
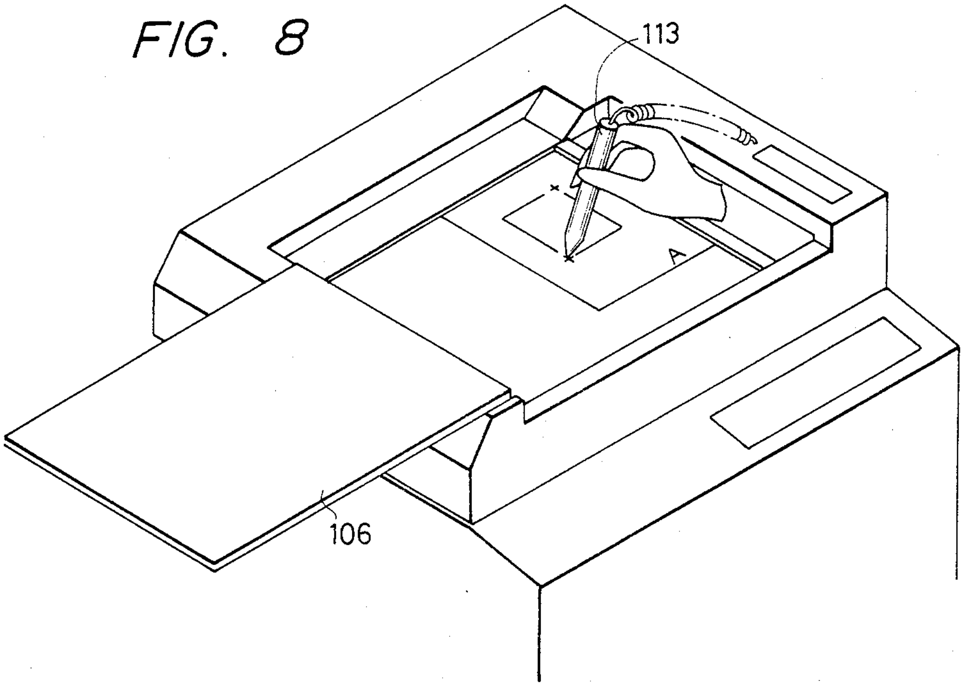
FIG. 8 is a perspective view showing an operating state of the digitizer.

A specific position or area on the original can be designated by two diagonal points and hence a rectangular area, as shown in FIG. 8. However, in order to specify the location of the designated area on the original, the reference of the original must be specified. By specifying the reference of the original, the designation errors can be reduced. For this reason, the same reference abutment guide as in the copying machine or the like is preferably provided on the digitizer. In particular, in a digitizer having a document feed mechanism, it is preferable to align the original reference on the destination image forming apparatus with the (original) reference of the digitizer. More specifically, the document feed mechanism is operated while the original movement and orientation are minimized, thereby reducing the manipulation errors and improving convenience in use of the apparatus. From these viewpoints, the reference position along a direction perpendicular to the scanning direction of the image forming apparatus is aligned with the original (abutment) reference of the image forming apparatus. At the same time, a reference abutment along the original scanning direction of the image forming apparatus is arranged at a spatially opposite side of the original reference of the image forming apparatus along the right-and-left direction. The original is then fed along the original scanning direction of the image forming apparatus.

Figure 7:
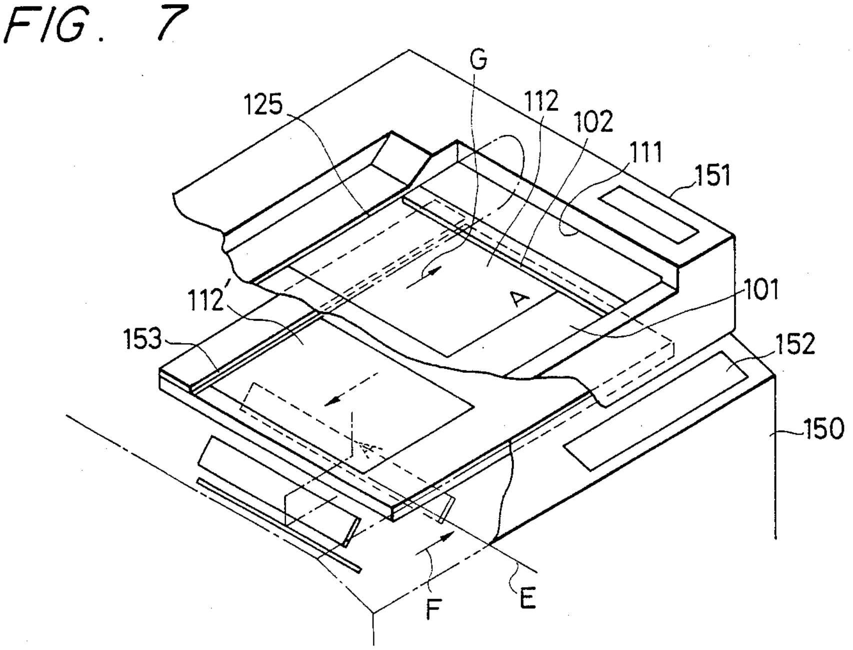
FIG. 7 is a perspective view showing an original reference position in the digitizer.

The original reference position of an image forming apparatus 150 coupled to the document feeding apparatus with a digitizer is a rear left position when viewed by the operator, and the reference position of the digitizer is defined as a rear right position when viewed by the operator (FIG. 7).

Referring to FIG. 7, this system includes a document feeding apparatus 151 with a digitizer (i.e., the original position detecting device), and an operation panel 152 of the image forming apparatus. The image forming apparatus has an original abutment reference 153 and an original reference E, an original scanning direction F, and an original convey direction G. Note that an original 112' is placed on the platen of the image forming apparatus. Other arrangements of this system are the same as those in FIG. 5, and a detailed description thereof will be omitted.

The operation of this system will be described below.

The operator opens the cover 106 of the document feeding apparatus. As shown in FIG. 7, the operator places the desired original 112 on the digitizer 101 such that the image surface of the original faces upward. The operator then brings the right end of the original into abutment with a reference original abutment 102 and the rear side into abutment into a reference abutment 125. The operator designates a desired area on the document surface with a stylus pen (not shown). Various conventional input and detection schemes for the digitizers have been proposed, and a detailed description thereof will be omitted. When the input operation is completed, the operator selects a desired mode with function keys (not shown) so as to determine whether the image of the designated image is copied. Thereafter, the operator inserts the original into the original convey port 111. The subsequent operations are the same as those in FIG. 5, and a detailed description thereof will be omitted.

With this arrangement, the original reference (the reference along the original feed direction) is aligned with the original feed direction, i.e., the side of the second original convey port. The distance for displaying the original to the second original convey port 111 can be minimized, and at the same time, the original reference (the reference in a direction perpendicular to the original feed direction) has the same level as that of the second original convey port, thereby simplifying the original convey operation.

If image area designation is performed for a plurality of originals, these originals have sizes smaller than a maximum originals size. Even if the processed original is fed back to the digitizer, it is exhausted at a position away from the original reference of the digitizer. Feeding of the next original is not interfered.

In the case of original feeding from the second original convey port near the digitizer, many devices and means (the document feeding system represented by the original distal end sensor, the conveyor belt, and the like; and a control means for conveying the original) can be commonly used in the case of original feeding the through the normal original convey port. Therefore, the document feeding apparatus as a whole can be simplified.

The document feeding apparatus is also applicable for an image forming apparatus wherein a moving original is exposed by the fixed original exposure reflecting mirror.

Another embodiment of a cover (protecting means) of the digitizer will be described with reference to FIGS. 9 to 11.

In this embodiment, when the digitizer is not used, the original table (cover) covers the surface of the digitizer and protects the surface of the digitizer from accidental impact, thereby providing the apparatus with high reliability.

Figure 9:
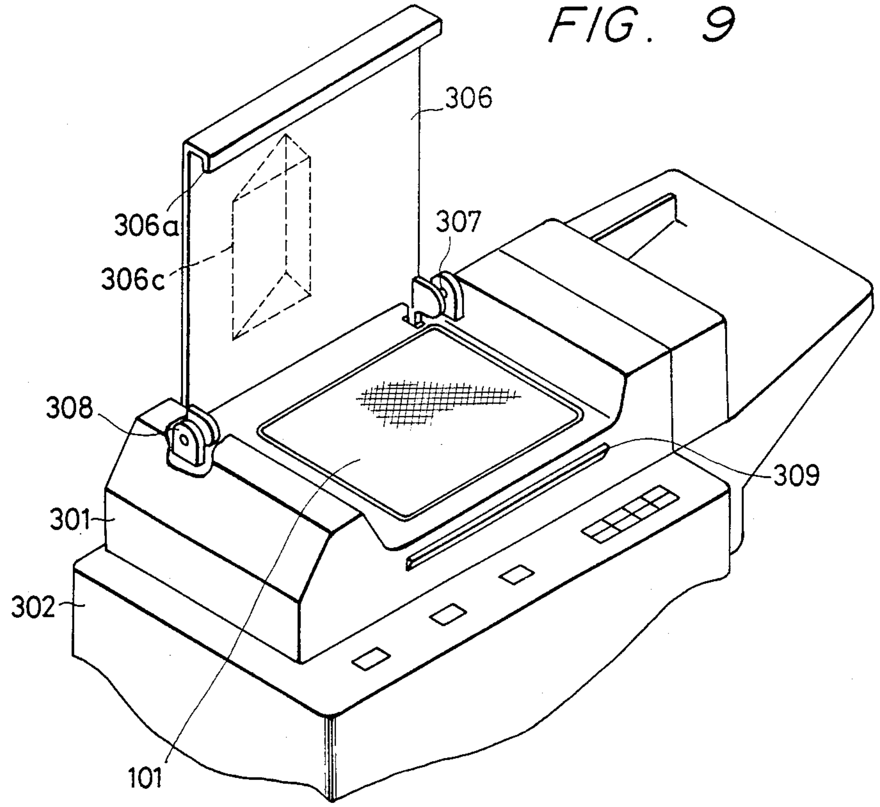
FIGS. 9, 10A and 10B are perspective views showing another arrangement of a cover.
Figure 11:
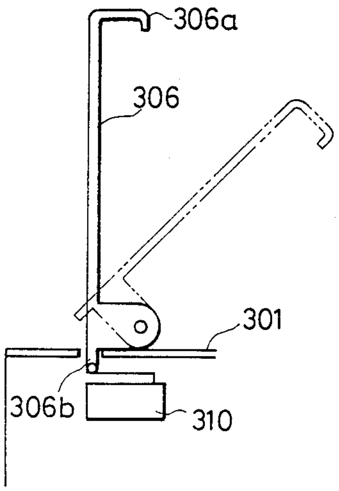
FIG. 11 is a sectional view showing part of the cover.

Referring to FIGS. 9 to 11, the document feeding apparatus with a digitizer includes an original table 306 serving as a cover, pivotal supports 307 and 308 mounted to a document feeding apparatus 301 to pivot the original table 306, and a projection 309 partially extending on the document feeding apparatus 301. A ratchet **306*a* constitutes part of the original table 306. When the original table 306 is closed, the ratchet 306*a* is engaged with the projection 309. A projection 306*b* also constitutes part of original table 306. A microswitch 310 is arranged inside the sheet document feeding apparatus 301 to detect opening/closing of the original table 306. Other arrangements of the document feeding apparatus are the same as those of FIG. 5**.

With the above arrangement, in order to perform copying, the operator opens the original table 306, as shown in FIG. 9. In this case, the projection **306*b* of the document table presses the microswitch 310, as shown in FIG. 11. A depression signal from the microswitch 310 is supplied as an image area designation mode signal to a microprocessor unit (to be referred to as an MPU) in a copying machine housing 302. In this state, even if the originals are inserted in the lower convey ports 3 and 4 (FIG. 5) of the document feeding apparatus 301 and the original sensor 11 (FIG. 5) detects the originals, an ON signal is not sent from the MPU to the plunger 30 (FIG. 6). In this case, automatic document feeding is not performed. The operator places an original on the digitizer, inputs a desired area on the original, and sets a desired mode. The operator then inserts the original in the original convey port 111 (FIG. 5) so that the original can be automatically fed. If the original table 306** is closed during copying, the document is automatically exhausted thereon.

Figure 10A:
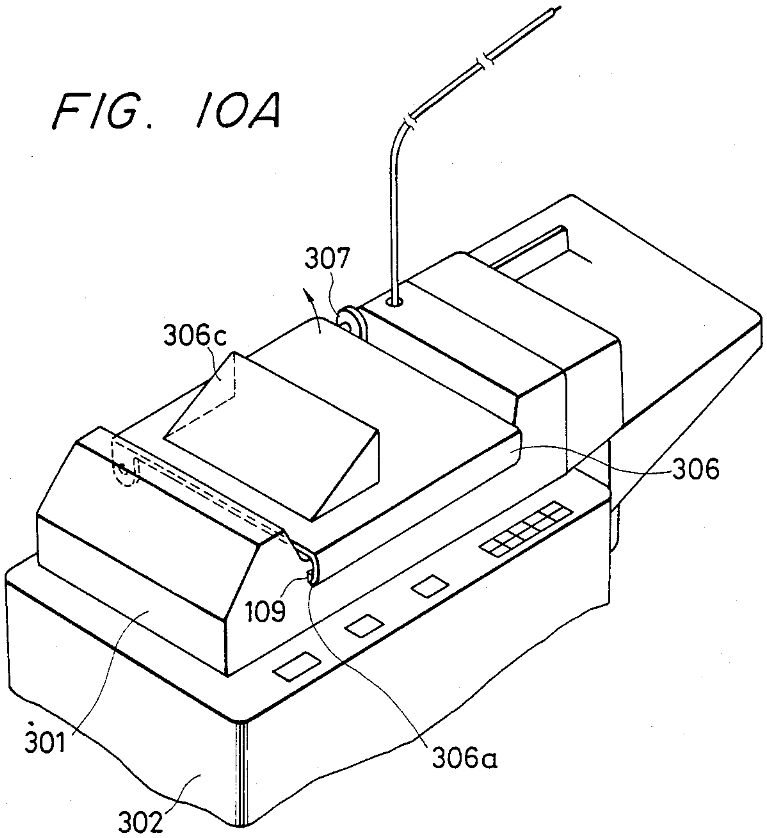
Figure 10B:
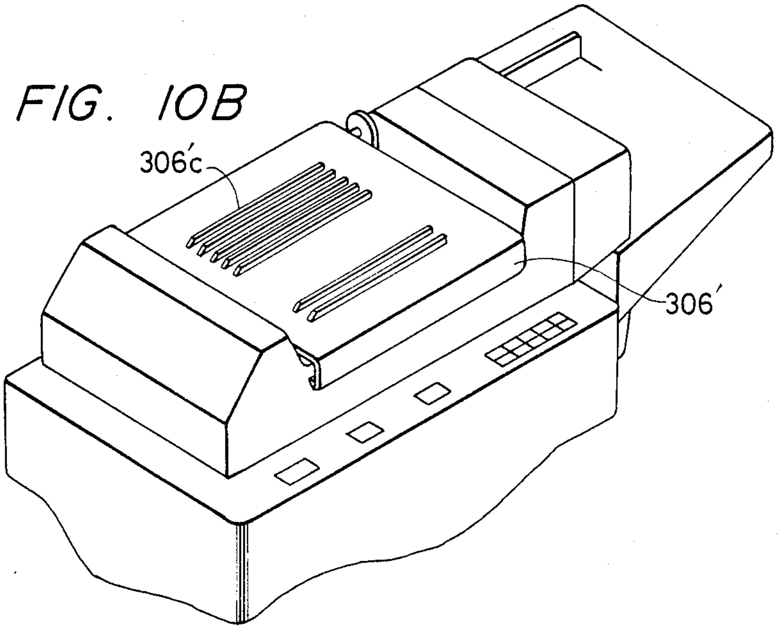

If copying is performed without using a digitizer, the original table 306 is closed, as shown in FIGS. 10A and 10B, and the ratchet **306*a* of the original table 306 is engaged with the projection of the document feeding apparatus 301. Thereafter, the operator inserts the original into the lower original convey ports 3 and 4** and sets a desired copying mode. Therefore, normal copying is started.

The original table 306 in this embodiment is preferably made of a material having a small friction coefficient and a low friction charging level for the original. The outer shape of the original table 306 is preferably designed, as shown in FIG. 10A. An inclined surface **306*c* of the original table 306 is arranged to properly receive the original thereon. In addition, as shown in FIG. 10B, ribs 306*c*' are formed on the surface of the original table 306 to reduce the contact area with the original so that the original can be easily slid along the surface of the original table 306. Furthermore, the original table 306** is desirably made of a material having a good heat insulation property so as to prevent the digitizer from being thermally adversely affected.

As described above, according to this embodiment, since the original table as the protecting means is provided on the surface of the digitizer, the original exhausted from the document feeding apparatus can be smoothly exhausted without being influenced by the resistance force from the material of the digitizer surface and the electrostatic attraction force generated by frictional charging of the material of the digitizer surface. Therefore, even if a large number of originals are processed, the exhausted originals can be properly stacked. In particular, the material and shape of the original table can be arbitrarily determined from a wide selection range to allow easy stacking of the originals on the table, thus providing a practical document feeding apparatus. The original table is pivotal with respect to the digitizer so that it can be shifted to a position where the table does not interfere with the operation on the digitizer, and therefore the original table guarantees good operability Furthermore, even if the original heated by radiation from a halogen lamp in the optical system is exhausted, the original is not directly placed on the digitizer. The original table can be made of a material having a good heat insulation property. Therefore, the digitizer is free from drawbacks such as operation failure by heat from the original and damage to the electrode.

The original table is arranged to cover the surface of the digitizer. The digitizer is therefore protected against an accidental impact and dust such as paper dust.

The disadvantages caused by a digitizer without a cover will be described below.

When the document feeding apparatus is used and copying of an original placed on the original table of the copying machine housing is completed, the original is exhausted onto the surface of the digitizer. In this case, the surface of the digitizer normally has a large friction coefficient for the original (paper) since the original must be placed on the surface of the digitizer and digitizing must be performed. For this reason, the original receives a frictional resistance from the surface of the digitizer after copying is completed, and it is not smoothly exhausted onto the surface of the digitizer. In the worst case, the original is not completely exhausted and tends to be partially left in the document feeding apparatus. Even if the original is completely exhausted onto the surface of the digitizer, it is very difficult to stack the originals on the digitizer in a well-aligned manner.

In addition, since the original is heated by radiation from the halogen lamp in the optical system while the original is placed on the original table (platen glass) upon completion of copying, the exhausted original on the surface of the digitizer may increase the temperature of the digitizer surface. In particular, this problem is crucial when a plurality of originals are stacked in a system including an ADF and a digitizer. The plurality of heated originals stacked on the surface of the digitizer may cause operational failure of the digitizer due to an increase in temperature of the surface of the digitizer, and the electrodes arranged on the lower surface of the digitizer may be damaged.

In addition, small paper dust particles are stacked on the surface of the digitizer in use for a long period of time and may cause the operational failure of the digitizer in actual use.

In addition, the following problems are presented.

An insulating sheet is formed on a pair of electrode plates in the digitizer. Originals are repeatedly exhausted on the surface of the digitizer and the surface sheet may be damaged by the edges of the originals. In the worst case, the upper electrode plate may be exposed to cause an accident.

The surface sheet has an electrically insulating property and tends to be charged by friction with the original upon its exhaustion. As a result, the original may not be smoothly exhausted by charging of the surface sheet.

Still another embodiment of the digitizer cover will be described with reference to FIGS. 12 to 16.

Figure 12:
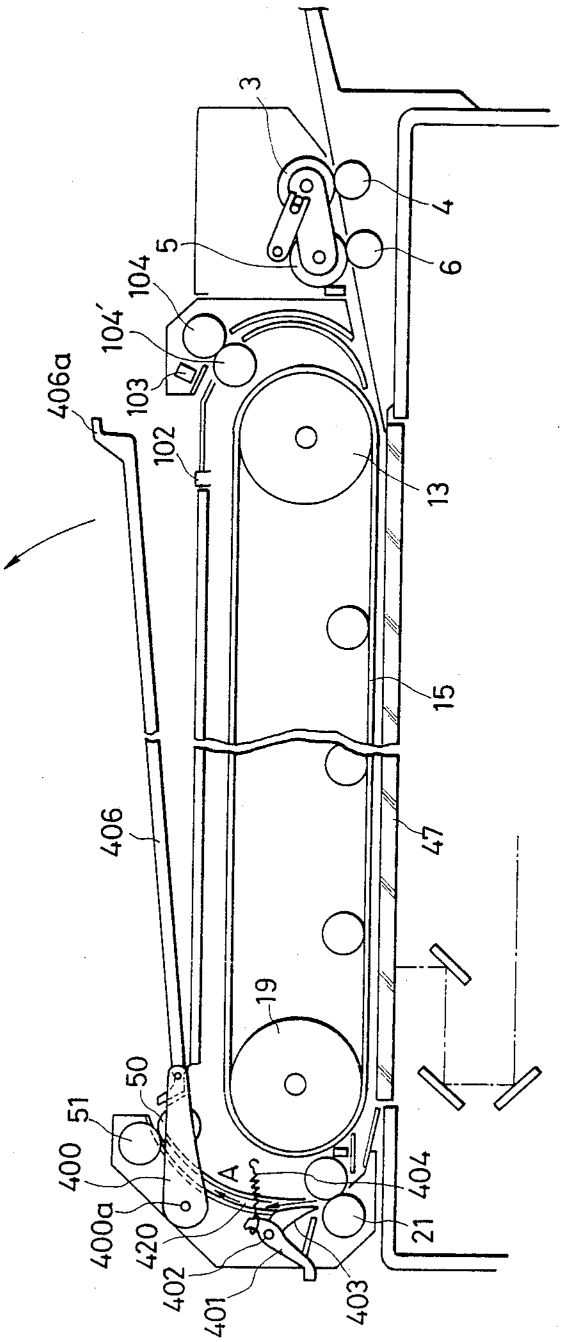
FIG. 12 is a sectional view showing still another arrangement of the cover in the automatic document feeding apparatus of the present invention.

FIG. 12 is a sectional view showing the arrangement of this embodiment of the apparatus according to the present invention. A digitizer cover 406 is locked to be pivotal about an arm 400. The arm 400 is mounted on the housing and pivotal about a shaft 400*a*. The digitizer cover has a cover handle 406*a* at its right end. The user holds the handle 406*a* and pulls up the cover 406 in a direction of an arrow. In this case, a flapper lever 401 is located in an illustrated position. One end of a spring 404 is hooked at one end of the flapper lever 401. The other end of the spring 404 is fixed on the document feeding apparatus housing by means (not shown). The flapper lever 401 and a flapper 403 are pivoted about a shaft 402. The flapper 403 is located at a position so as to convey the original in a direction of arrow A in an exhaust path 420. Other arrangements of the original convey mechanism are the same as those of FIG. 5.

Figure 13:
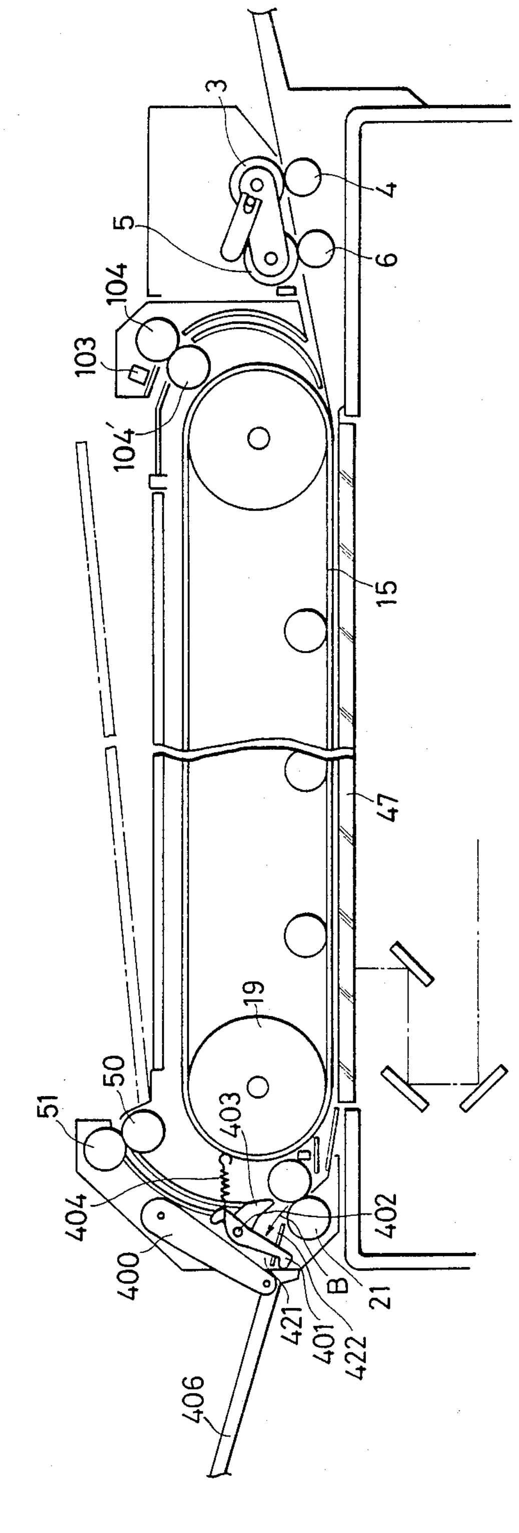
FIG. 13 is a sectional view showing an operating state of the cover in the automatic document feeding apparatus of the present invention.

FIG. 13 shows a state wherein the digitizer cover 406 is set at a second original exhaust port 421. In this case, the digitizer cover 406 serves as an exhaust tray of the second original exhaust port 421. The right end face of the digitizer cover urges the distal end of the flapper lever 401 to pivot it about the shaft 402 counterclockwise. Upon pivotal movement of the flapper lever 401, the flapper 403 is pivoted counterclockwise and reaches the position in FIG. 13. Upon movement of the flapper 403, the original is conveyed in a direction of arrow B and is exhausted on the digitizer cover 406 as an exhaust tray through the second original exhaust port 421.

Figure 14:
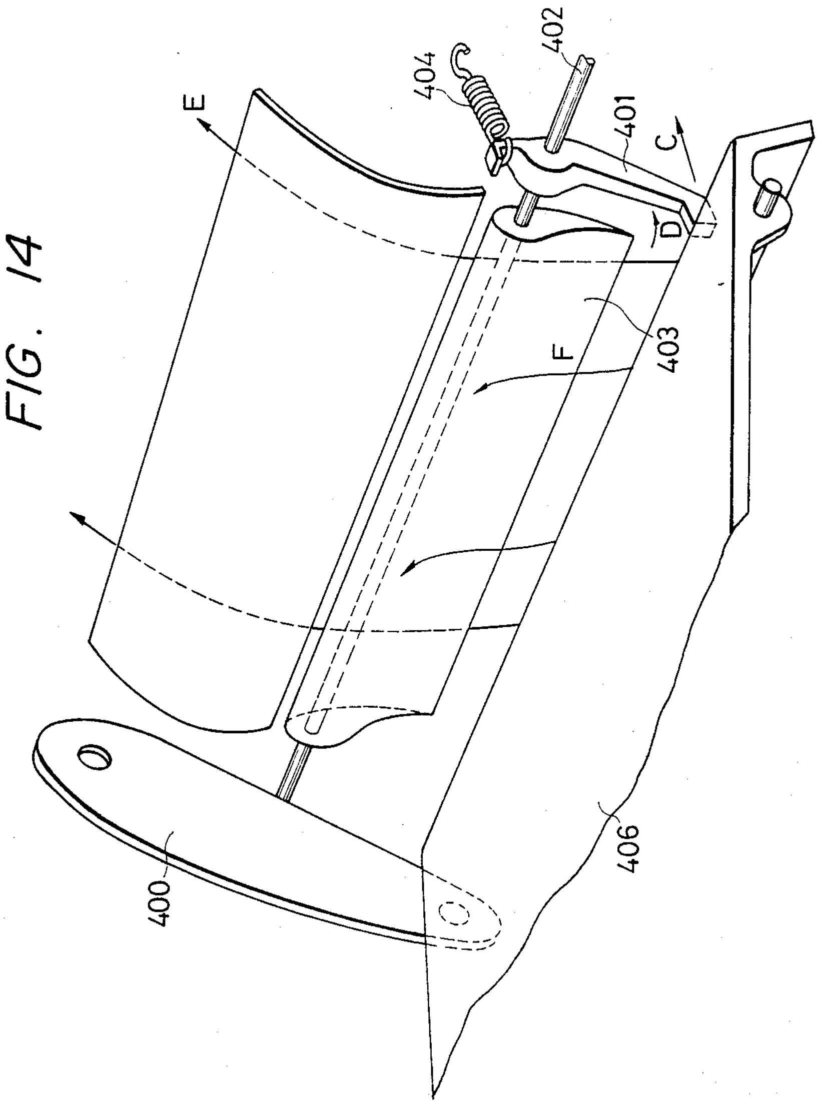
FIG. 14 is an enlarged perspective view showing the arrangement in FIG. 13.

FIG. 14 is an enlarged perspective view showing the arrangement (FIG. 13) around the flapper at the second original exhaust port 421. When the digitizer cover is set at the second original exhaust port 421, the digitizer cover 406 urges the flapper lever 401 in a direction of arrow C to rotate the flapper tip in a direction of arrow D. The original convey path is switched from the direction of arrow E to the direction of arrow F so that the original is exhausted on the exhaust tray.

Still another embodiment will be described with reference to FIG. 15.

In the embodiment of FIGS. 12 to 14, the digitizer cover also serves as the exhaust tray of the second original exhaust port. However, in the embodiment of FIG. 15, the digitizer cover and a separate exhaust tray are provided. The separate exhaust cover is attached to the left end of the document feeding apparatus.

Figure 15:
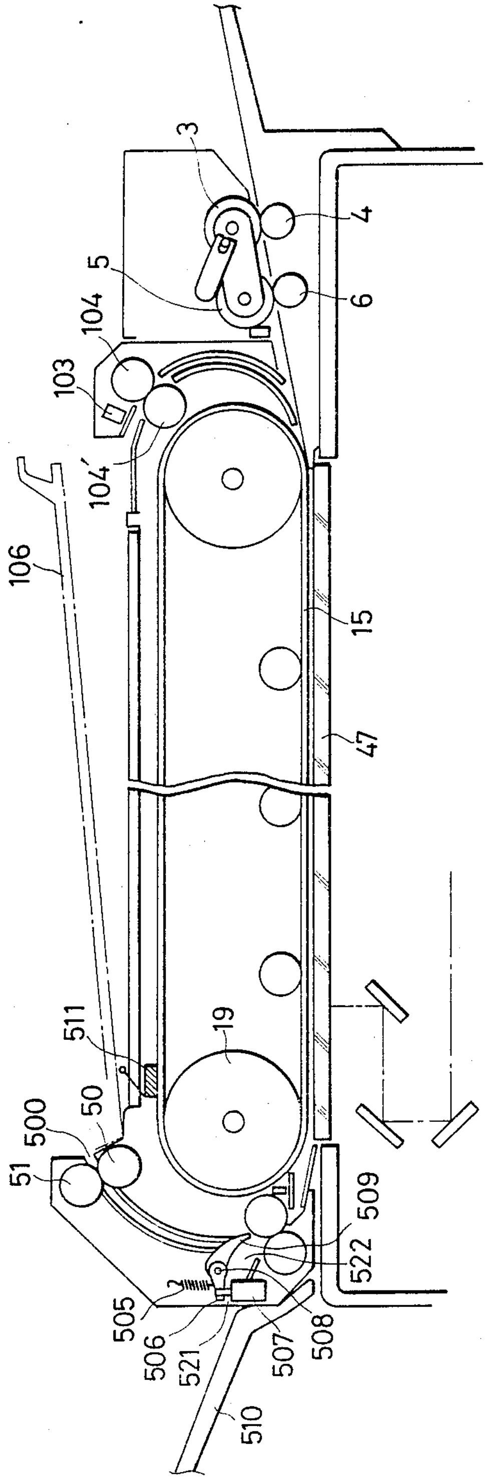
FIG. 15 is a sectional view showing a detailed arrangement of the present invention.

Referring to FIG. 15, the arrangement has a microswitch 511 for detecting opening/closing of a digitizer cover 106 and is fixed on the upper surface of the digitizer by a means (not shown). With this arrangement, if the operator wishes to use only the function of a DF (Document Feeder), the digitizer cover 106 is located in the normal position, i.e., a position where it covers the digitizer. The original is exhausted onto the digitizer cover 106 through a normal exhaust port 500.

When an image area is designated on the digitizer, the operator opens the digitizer cover 106 to turn off the microswitch 511. A signal from the microswitch 511 is sent to a control microcomputer (not shown). The original exhaust tray must be switched to an exhaust tray 510 for the second original exhaust port 521. A voltage is applied to a solenoid 507 to pivot a flapper 509. The flapper 509 and a flapper lever 506 are pivotal about a single shaft 508. The plunger of the solenoid 507 is engaged with the flapper lever 506. However, if the voltage is not applied to the solenoid 507, a spring 505 biases the flapper lever 506 so that the lever 506 is disengaged from the plunger of the solenoid 507.

Upon application of a voltage to the solenoid 507, the flapper 509 is pivoted and the convey path is switched to a convey path 522 for conveying the original to the exhaust tray 510.

Figure 16:
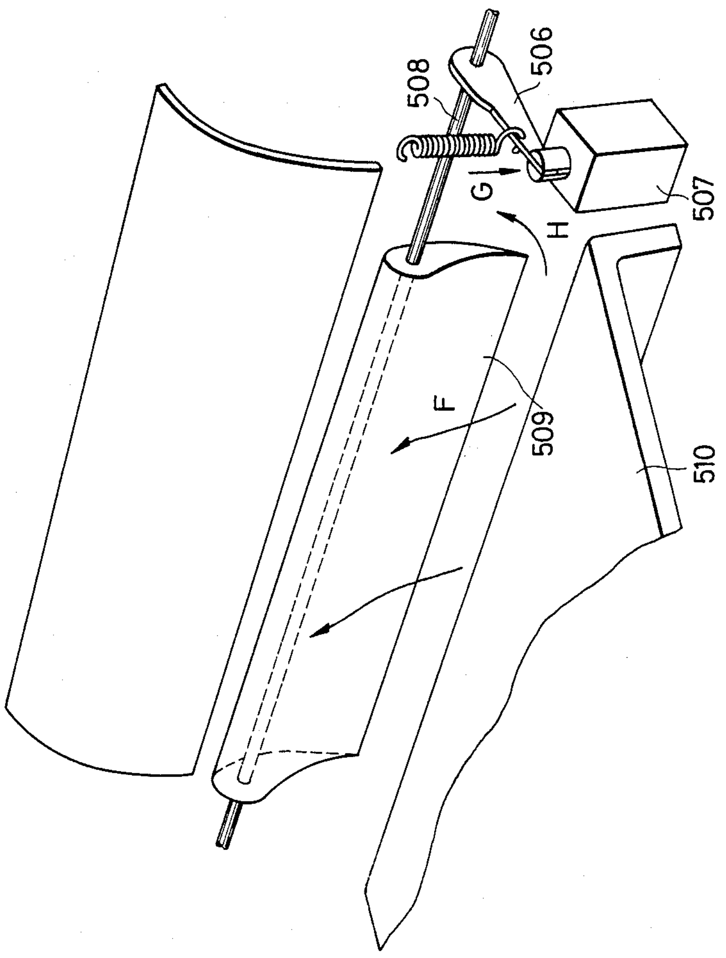
FIG. 16 is an enlarged perspective view showing the arrangement FIG. 15.

FIG. 16 is an enlarged perspective view representing the main part of the apparatus (FIG. 15), showing a state wherein the original convey path is switched to the one for the exhaust tray upon application of the voltage to the solenoid 507 and pivotal movement of the flapper 509. When the voltage is applied to the solenoid 507, its plunger is retracted in the direction of arrow G and then the flapper 509 is pivoted about the shaft 508 in the direction of arrow H. As a result, the convey path is switched to the one in the direction of arrow F.

A system wherein the digitizer cover is not used as the exhaust tray as in this embodiment, i.e., the separate exhaust port and tray are provided and the digitizer cover serves to only protect the upper surface of the digitizer, or a system without a digitizer cover can solve the same problems as described above.

According to this embodiment, postprocessing of the original upon image area designation at a DF with a digitizer and original conveyance using the DF can be simplified. In particular, in order to copy a plurality of originals whose image areas are designated, the operator need not touch the originals and the originals can be automatically continuously copied. Since the operation manipulation can be simplified, the operator can concentrate on a complicated operation such as image area designation, thereby obtaining copies with few mistakes.

Another embodiment of the digitizer will be described with reference to FIGS. 17 to 19.

In this embodiment, a digitizer 101 is located below a wide belt 605. DF original feeding is substantially the same as in FIGS. 1, 4 and 5 when the digitizer is not used, and a detailed description thereof will be omitted.

According to this embodiment, an abutment position reference mark (index mark) 624 is printed at a position on the surface of the belt 605 corresponding to the reference position of the digitizer. In addition, standard size position marks 625 are also printed on the surface of the belt 605. The belt 605 is preferably made of a material having a high friction coefficient with respect to paper. The operator sets the original at a reference position and designates a desired image area. More specifically, when the operator depresses the belt 605 with a stylus pen, the digitizer 601 is depressed. The image area designation procedures are the same as those described above. After image area designation is completed, the operator manually moves transfer paper into an original insertion port 606 until the leading end thereof abuts against a roller 604. When a paper sensor 603 detects the transfer paper, a photointerruptor (not shown) counts clocks. When the count of the photointerruptor reaches a predetermined value, a driving roller 13 is rotated. An original 112 passes through guide plates 605*b* and 605*c* and a feed roller 623 and is set on an original glass platen 47. In this state, the copying operation is started. The marks 624 and 625 printed on the belt 605 may also be copied. However, if these marks are printed with a color to which the photosensitive body used in a copying machine has low sensitivity, there is no fear of copying these marks. Thereafter, upon completion of copying, the driving roller 13 is driven again. The original 112 passes through the guide plates 602*b* and 602*a* upon movement of the belt 605 and returns to the initial position, i.e., the reference position of the digitizer. The original is stopped at a position corresponding to the reference position of the belt 605. With this arrangement, there is provided a DF with a digitizer arranged inside the belt. The drive mechanism of this arrangement is substantially the same as that of FIG. 6, and a detailed description thereof will be omitted. It should be noted that this arrangement include feed rollers 621 and 651.

In this embodiment, since the desired image area can be designated on the belt 605 with a stylus pen, the sensitivity tends to be lower than that in the conventional digitizer. However, a noncontact type digitizer such as an electrostatic or electromagnetic induction type digitizer can detect a pressure point away from the digitizer by 5 to 10 mm with precision of 0.5 to 1 mm. Even if a contact type digitizer is used, a suitable pressure allows detection of the designated image area if the thickness of the belt is about 1 mm.

In this embodiment, an original reference position is printed on the belt 605. However, the belt 605 may be a transparent belt so that the reference position on the digitizer is checked therethrough. In this case, a white board must be attached to the inner surface of the belt on the side of the original glass.

The original abutment reference 604 is located at the front right side in this embodiment. However, the position of the reference 604 is not limited thereto, and can be at the front left side, rear right side, or the rear left side.

Figure 19:
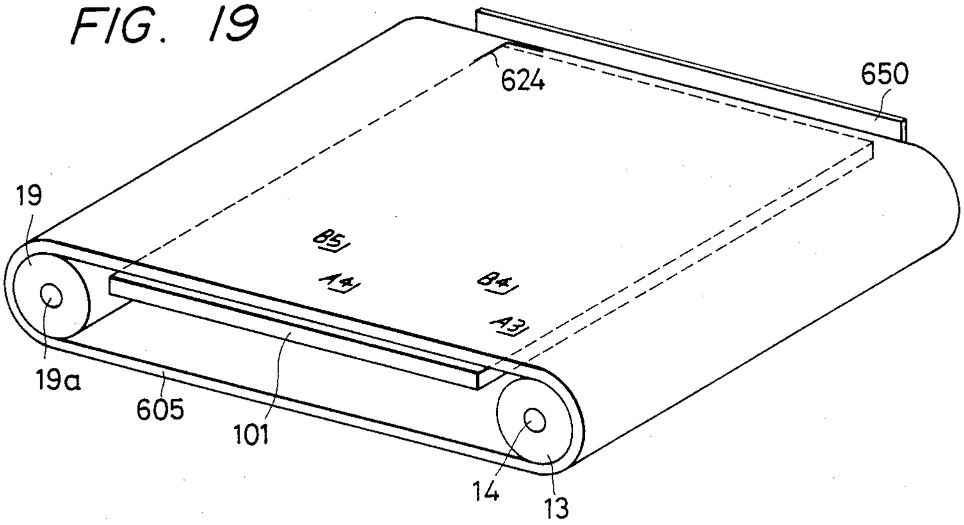
FIG. 19 is a perspective view of a document feeding apparatus according to still another embodiment of the present invention.

As shown in FIG. 19, an original abutment plate 650 may be arranged. With this arrangement, the original position is not deviated from the reference position as compared with the case wherein the original is simply placed on the conveyor belt. Therefore, a desired image area can be accurately designated.

In this embodiment, the digitizer is arranged inside the wide belt, and the roller pair, the U-turn guide cover, and the like are eliminated to provide a low-profile DF with a digitizer, thereby improving operability of the DF.

As described above, since the digitizer is arranged inside the conveying means of the DF, the DF can be greatly made compact, and the original convey system can also be simplified.

With the above arrangement, the following effect can also be expected.

If the digitizer is of an electrode contact type, a desired image area can be simply input at a predetermined pressure. In other words, since the digitizer is very sensitive, the resistive elements may be damaged or broken if an object is directly placed thereon. Therefore, a protecting means such as a cover is attached on the digitizer. With this arrangement, the wide belt as the original conveying means also serves as the cover of the digitizer. Therefore, a separate protecting means is not required.

Figure 17:
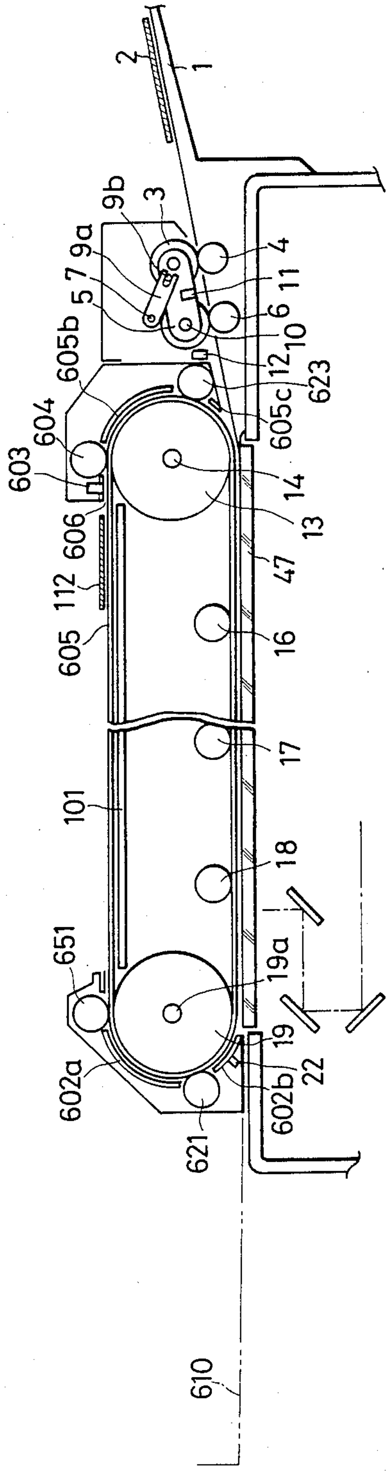
FIG. 17 is a side sectional view of a document feeding apparatus according to still another embodiment of the present invention.
Figure 18:
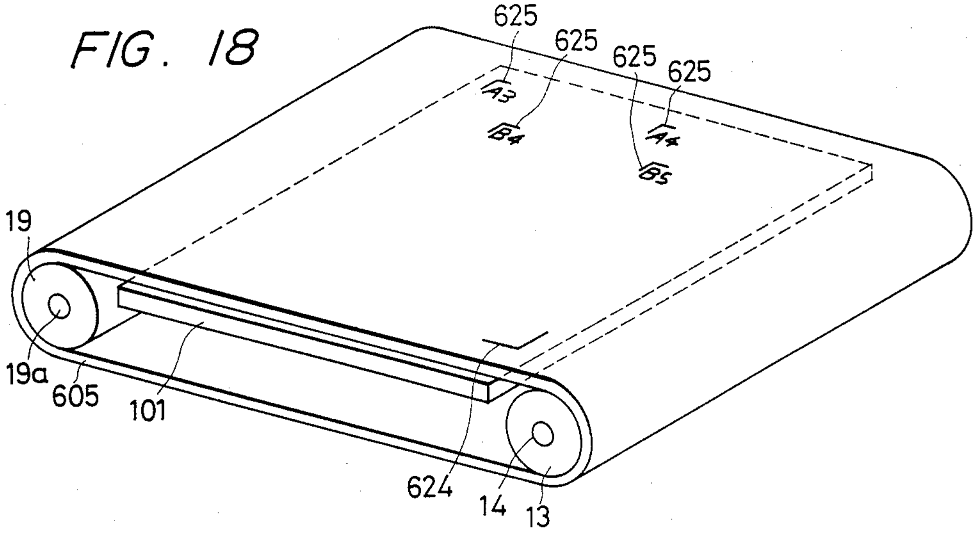
FIG. 18 is a perspective view showing the main part in FIG. 17.

In the embodiment shown in FIG. 17, the original is manually operated so that the operator inserts the original into the insertion port. However, after the operator places the original at the image area reference position and designates the desired image area, the original may be attached to the wide belt and may be fed onto the original glass. In this case, the wide belt must be in constant contact with the original. For this purpose, the original may be drawn onto the wide belt by a suction force applied on the original from the wide belt, or the wide belt may be made of a material which attracts the original. Alternatively, the original may be held on the wide belt by means of mechanical members such as grippers. A detailed description of these modifications will not be made therein.

An exhaust tray 610 may be arranged to freely switch the guide 602*b*. In normal copying, the original may be exhausted onto the exhaust tray 610. Of course, the original processed on the digitizer may also be exhausted in the exhaust tray 610.

Another embodiment having features in the original convey direction will be described with reference to FIGS. 20 to 24.

In the above description, the document feeding apparatus with a digitizer of this type feeds the original in a direction of arrow O parallel to the convey direction of arrow P (or the scanning direction of the optical system) of the transfer paper. For this reason, when the original 112 (for illustrative convenience, only the illustrated arrow is designated on the digitizer) is set on the original table by means of a document feeding apparatus (e.g., the one in FIG. 5), the direction of the arrow on the original is opposite the transfer paper convey direction P. The direction of the arrow on a transfer paper 732 with the image of arrow is opposite that of the original 112 on the digitizer along the transfer sheet convey direction.

It is time-consuming to change and correct the designated area on the digitizer by referring to the image on the transfer sheet since the direction of the image on the copied transfer paper 732 is opposite that on the original 112 on the digitizer.

In addition, when an image is superposed on a copied transfer paper or transfer paper 733 with directivity, it is very confusing to designate the image area on the digitizer or feed the copied transfer paper or the transfer paper 733 with directivity into the copying machine since the direction of the image on the digitizer is opposite that on the exhausted transfer sheet along the transfer sheet convey direction.

In consideration of the above problem, the original feed direction is perpendicular to the transfer convey direction in the document feeding apparatus of this embodiment.

Figure 20:
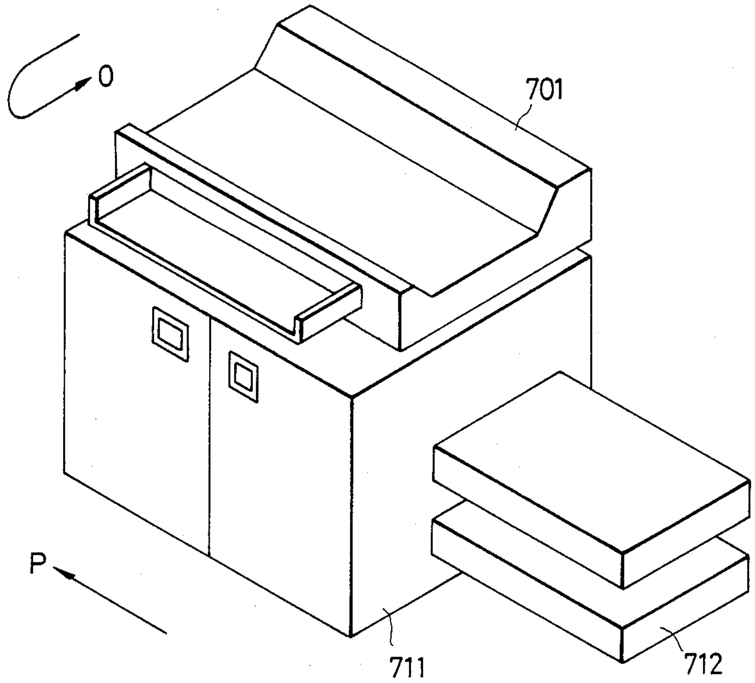
FIG. 20 is a perspective view of an image forming apparatus with a document feeding apparatus according to still another embodiment of the present invention.

This embodiment will be described in detail with reference to FIG. 20. A system in FIG. 20 includes a copying machine 711 having a transfer paper cassette 712 and a document feeding apparatus 701 with a digitizer. An original feed direction O is perpendicular to a transfer paper convey direction P of the copying machine. The arrangement and operation of the document feeding apparatus with reference to FIGS. 4 to 6, and the description will not be repeated.

The advantage of the arrangement where in the original feed direction is perpendicular to the transfer paper convey direction will be described with reference to FIGS. 21 and 22.

Figure 21:
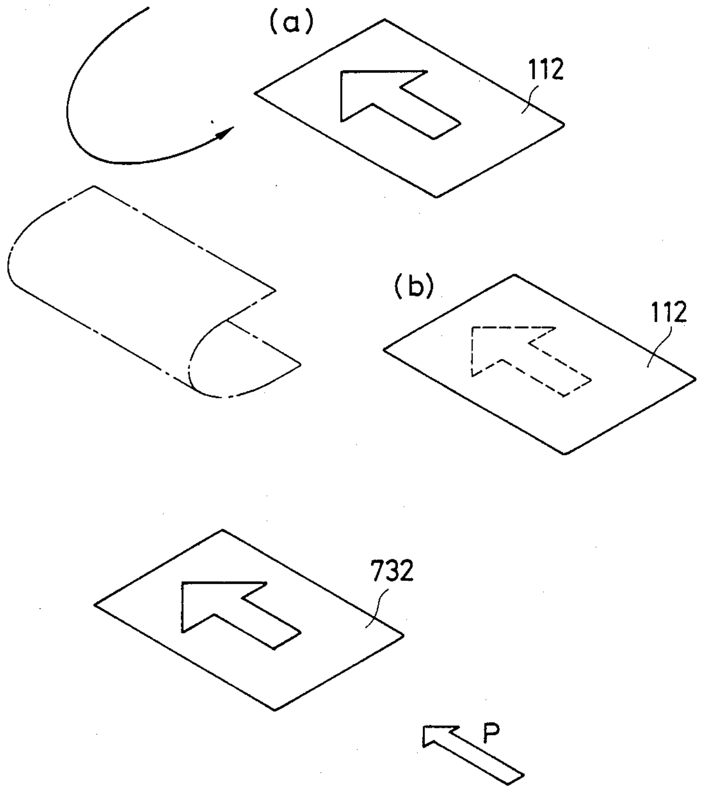
FIGS. 21 and 22 are views for explaining the positional relationship between the original and the transfer paper in the automatic document feeding apparatus with a digitizer.

Referring to FIG. 21, when the arrow (represented by reference numeral 112) as an original whose image area is designated on the digitizer is fed and set by the document feeding apparatus at a position ((b) in FIG. 21) on the original table, the direction of the arrow is the same as the transfer convey direction P. The direction of the arrow copied on the exhausted transfer paper 732 is the same as the transfer paper convey direction P of the arrow.

The operator can change and correct the image area designated on the digitizer by referring to the image on the copied transfer sheet, thus improving operability since the direction of the image on the transfer paper 732 is the same as the transfer paper convey direction P.

Figure 22:
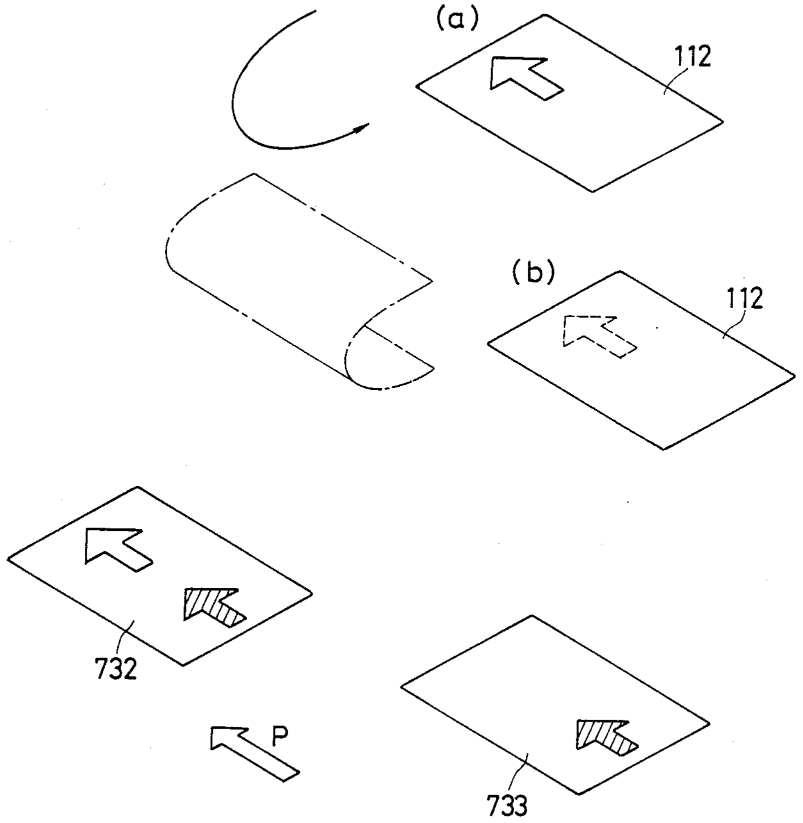
Figure 23:
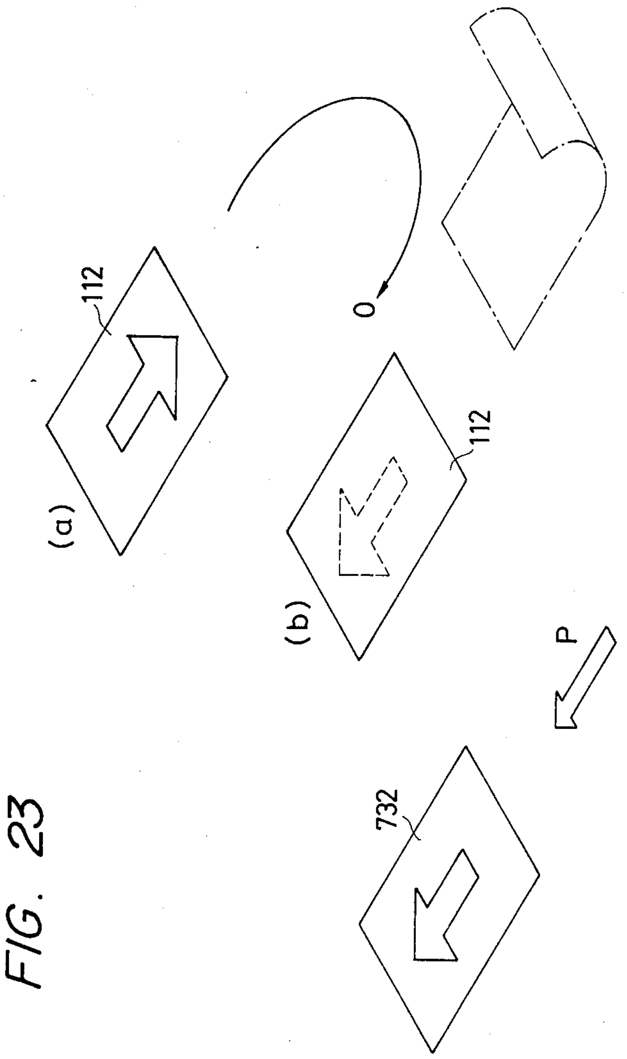
FIGS. 23 and 24 are views for explaining the normal positional relationship between the original and the transfer paper in the automatic document feeding apparatus with a digitizer.
Figure 24:
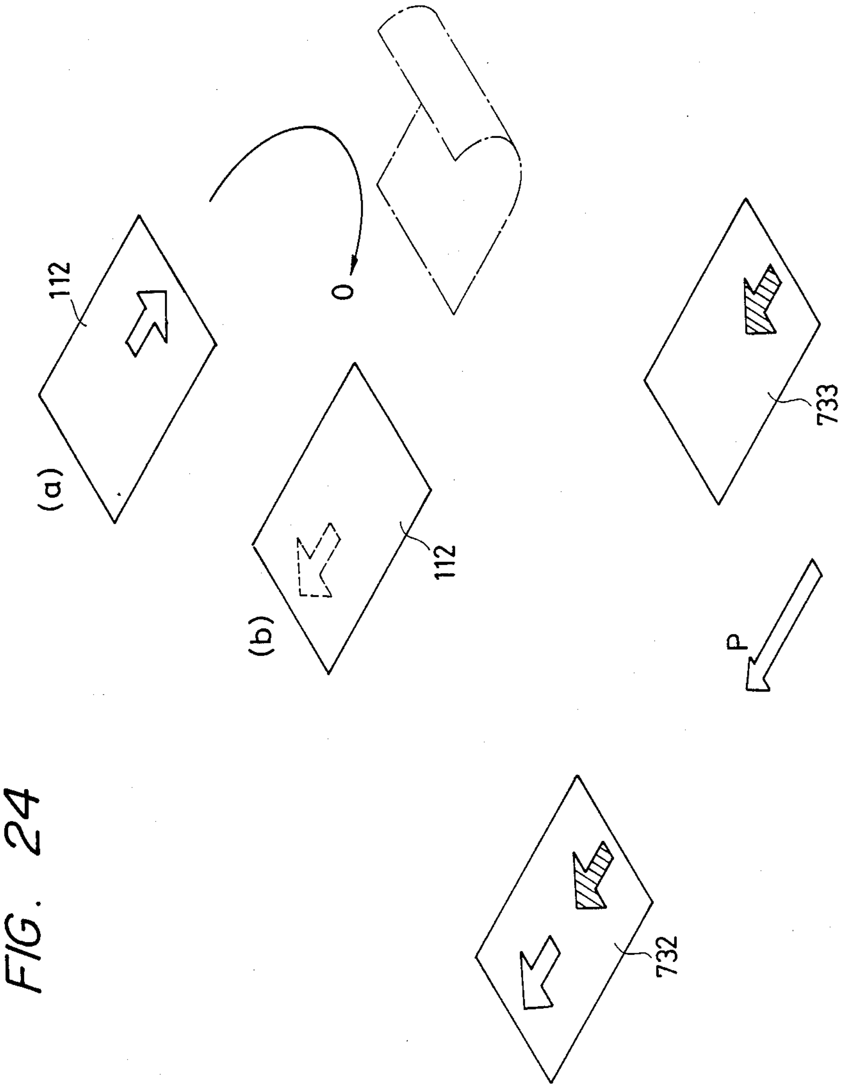

FIG. 22 shows a case wherein an image designated by the digitizer is superposed on the copied transfer paper or the transfer paper 733 with directivity. In this case, the direction of the image on the digitizer is the same as the direction of the image on the transfer sheet with respect to the transfer paper exhaust direction P. Therefore, it is very convenient to designate the image area on the digitizer or feed the copied transfer paper or the transfer paper 733 with directivity into the copying machine. This embodiment is also applicable to the arrangement in FIG. 17.

The operation of the copying machine upon designation of a desired image area on the digitizer will be described hereinafter.

Figure 25:
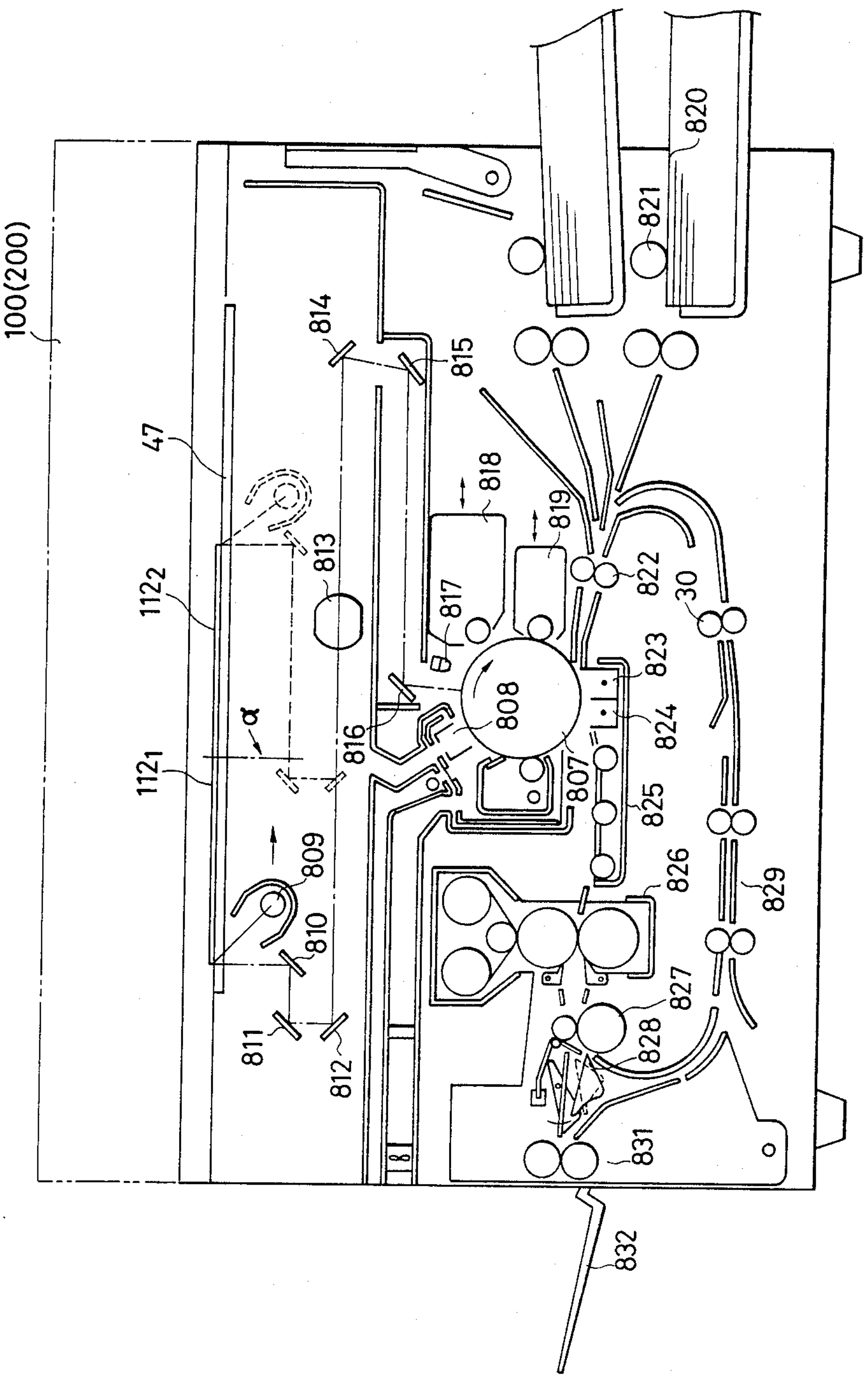
FIG. 25 is a view showing an arrangement of a copying machine.
Figure 26B:
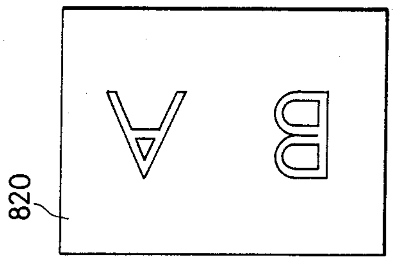
FIG. 26B is a view showing a finished sheet material (copy).
Figure 26A:
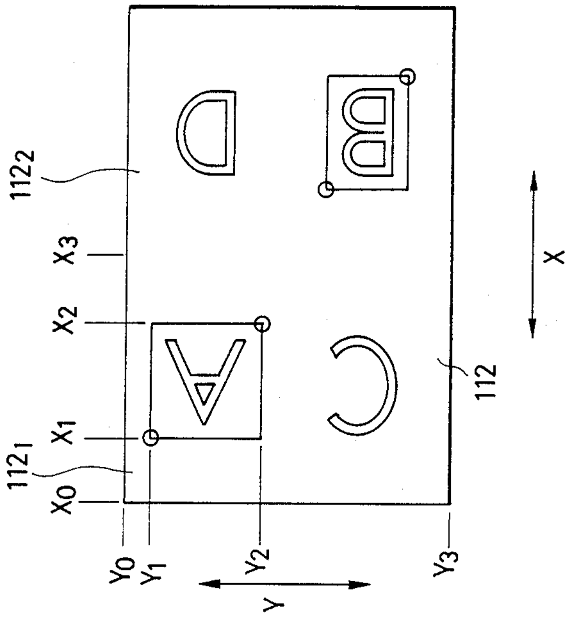
FIG. 26A is a view showing image area designation operation of the original.

FIG. 25 is a sectional view of a copying machine employing the present invention. The arrangement and operation of the copying machine will be described with reference to FIG. 25 and FIGS. 26A and 26B. The operation is exemplified by double copying with multicolor and image area designation functions. An original 112 consists of an original $\mathbf{112_1}$ and an original $\mathbf{112_2}$ which have the images shown in FIG. 26A. After an image A of the original $\mathbf{112_1}$ and an image B of the original $\mathbf{112_2}$ are extracted, the image A is copied in black and the image B is copied in red on transfer paper, as shown in FIG. 26B. For this purpose, the operator simultaneously depresses three buttons, i.e., the double copying button, the multicolor copying button, and the area designation button. At the same time, a red selection button is depressed for the second copying cycle (normally, the black toner is automatically selected in the first copying cycle, but the red toner may be selected for the first copying cycle). The operation will be described in detail below. The original 112 is placed on the digitizer 101, as shown in FIG. 26A. The an input or stylus pen diagonal points (x1, y1) and (x2, y2) indicated by the hollow dots in FIG. 26B, thereby designating the image A. The image B is also designated in the same manner as described above. The original 112 is placed on the original platen glass 47 in the manner as previously described.

When the operator depresses a copy button on the operation panel, a photosensitive drum 807 is uniformly charged by a charger 808 and is rotated in the direction of the arrow. At the same time, an illumination system including a lamp 809, and mirrors 810, 811 and 812 starts exposing the original $\mathbf{112_1}$ with light. After the illumination system scans the original $\mathbf{112_1}$ up to the alternate long and short dashed line $\alpha$, the system returns to the initial position An original image scanned by the illumination system is guided onto the photosensitive drum 807 through a lens 813 and mirrors 814, 815 and 816. An electrostatic image of the original $\mathbf{112_1}$ is thus formed on the photosensitive drum 807. A light-emitting element array 817 consisting of a large number of light-emitting elements such as LEDs is arranged along a direction of the central axis (i.e., the direction perpendicular to surface of FIG. 25). The light-emitting element array 817 is selectively turned on along the Y direction in FIG. 26A in response to an area designation signal and is operated time-serially along the X direction. The drum surface portion corresponding to the area excluding the image A is exposed and discharged. Even if the original image is exposed on the discharged drum surface portion, any latent image (in this case, the image C) excluding the image A is not formed on the photosensitive drum. The copying machine includes a red toner developing unit 818 and a black toner developing unit 819. These developing units 818 and 819 can be moved with respect to the drum 807. In the state shown in FIG. 25, the red toner developing unit 818 is spaced apart further from the photosensitive drum 807 than the black toner developing unit 819 is. Therefore, the latent image of the image A is developed and visualized as a black toner image.

On the other hand, transfer paper 820 is fed by a paper feed roller 821 in the copying machine and is stopped by register rollers 822. The register rollers 822 start rotation at a timing when the distal end of the original is aligned with the distal end of the transfer paper. The transfer paper 820 is thus fed in the direction of the drum 807. An image is transferred by a transfer charger 823 to the transfer paper 820. The transfer paper 820 is separated by a separating charger 824 from the photosensitive drum 807. The transfer paper 820 reaches a fixer 826 through a convey mechanism 825, thereby fixing the image on the transfer paper 820. Thereafter, the transfer paper 820 is fed to a first exhaust roller 827. However, when double copying is designated, a flapper 828 is located by a drive source (not shown) immediately behind the roller 827 to a position indicated by the dotted line. After the transfer paper 820 passes the first exhaust roller 827, it is fed to a lower convey mechanism 829 through the flapper 828. The transfer paper 820 reaches lateral register rollers 830 and is clamped and stopped thereby. In this state, the flapper 828 returns to the position indicated by the solid line. The black toner developing unit 819 is separated from the photosensitive drum 807 and the red toner developing unit 818 comes close thereto.

The illumination system including the lamp 809, and the mirrors 810, 811 and 812 is driven and temporarily stopped at the position indicated by the alternate long and two short dashed line $\alpha$. The illumination system is then restarted to the position indicated by the dotted line. The illumination system then starts exposure of the original $\mathbf{112_2}$ from this position. After original scanning is completed, the illumination system returns to the position of the solid line. The image of the original $\mathbf{112_2}$ by this exposure is guided onto the surface of the drum. In the same manner as in the original $\mathbf{112_1}$, the light-emitting element array 817 is turned on in response to the area designation signal. Even if the other original image is exposed on the drum surface, a latent image of any other image (in this case, the image D) excluding the image B is not formed on the photosensitive drum 807. The latent image of the image B on the photosensitive drum 807 is developed by the red toner developing unit 818. On the other hand, the transfer paper 820 clamped between the lateral register rollers 830 is fed to the register rollers 822 upon rotation of the rollers 830. The lateral register rollers 830 rotate the feed direction of the transfer paper through 90° while feeding the transfer paper. The transfer paper 820 is fed toward the register rollers 822, and at the same time, the position perpendicular to the feeding direction of the transfer paper 820 is corrected to be the same as in the original $\mathbf{112_1}$. The subsequent operation for the transfer paper 820 is the same as that for the original $\mathbf{112_1}$. However, after the transfer paper 820 passes through the first exhaust roller 827 it is guided above the upper edge of the flapper 828 and reaches a second exhaust roller 831. Finally, the transfer paper 820 is exhausted onto a tray 832. Therefore, a multicolor image shown in FIG. 26 is formed on the transfer paper 820.

We claim:

1. A document feeding apparatus comprising:

first original supporting means on which an original is placed;

second original supporting means mounted on a housing of said document feeding apparatus and having an image area designation device for designating an image area of the original;

an original inlet port for receiving the original placed on said first original supporting means; and conveying means for conveying the original fed from said inlet port to a reading position and exhausting the original from the reading position, said conveying means guiding the original to the reading position without passing through said second original supporting means in a normal mode;

wherein in an image area designation mode, the original is placed on said image area designation device, a desired image area is designated, and the original is placed on said first original supporting means and is guided to the reading position through said inlet port.

2. A document feeding apparatus comprising:

first original supporting means on which an original is placed;

an original inlet port for receiving the original placed on said first original supporting means; and conveying means for conveying the original fed from said inlet port to a reading position and exhausting the original from the reading position; and second original supporting means mounted on a housing of said document feeding apparatus and having an image area designation device for designation an image area of the original;

wherein in an image area designation mode, the original is placed on said image area designation device, a desired image area is designated, and the original is placed on said first original supporting means and is guided to the reading position and through said inlet port and wherein the original is placed on said first original supporting means such that an image surface of the original faces down, the original is placed on said second original supporting means such that the image surface faces up, and the original whose desired image area is designated by said image area designation device is placed on said first original supporting means such that the image surface faces down.

3. An apparatus according to claim 1, wherein said conveying means constitutes original pressing means to be freely opened/closed with respect to said housing of said document feeding apparatus, second original supporting means being arranged on said original pressing means.

4. An apparatus according to claim 3, wherein said second original supporting means is arranged on an upper surface of said original pressing means.

5. An apparatus according to claim 1, wherein feeding means is arranged at said inlet port.

6. An apparatus according to claim 5, wherein detecting means is arranged at said inlet port, said feeding means being operated upon detection of insertion of the original by said detecting means.

7. An apparatus according to claim 1, wherein the original exhausted by said conveying means is returned to said second original supporting means via a return path.

8. A document feeding apparatus comprising:

a first original supporting means on which an original is placed;

a first original inlet port for receiving the original;

a second original supporting means mounted on a housing of said document feeding apparatus and having an image designation device for designating a desired image area of the original;

a second original inlet port formed near said second original supporting means;

conveying means for conveying the original received through said first original inlet port to a reading position and exhausting the original from the reading position, said conveyeing means conveying the original to the reading position without passing through said second original supporting means; and a convey path for guiding the original received by said second original inlet port to said conveying means;

wherein the original is placed on said image area designation device, the desired image area is designated, and the original is guided to the reading position through said second original inlet port, said convey path, and said conveying means;

9. An apparatus according to claim 8, wherein original feeding means is arranged in said convey path.

10. A document feeding apparatus comprising:

a first original inlet port for receiving an original;

conveying means for conveying the original received through said first original inlet port to a predetermined position and exhausting the original from the predetermined position;

original supporting means mounted on a housing of said document feeding apparatus and having an image designation device for designating a desired image area of the original;

a second original inlet port formed near said original supporting means; and a convey path for guiding the original received by said second original inlet port to said conveying means;

original feeding means arranged in said convey path;

wherein the original is placed on said image area designation device, the desired image area is designated, and the original is guided to the predetermined position through said second original inlet port, said convey path, and said conveying means, and detecting means arranged at said second inlet port, said original feeding means being operated upon detection of insertion of the original through said second inlet port by said detecting means.

11. An apparatus according to claim 8, wherein said conveying means constitutes original pressing means which is freely open/closed with respect to said housing, said second original supporting means being arranged on said original pressing means.

12. A document feeding apparatus comprising:

a first original inlet port for receiving an original;

conveying means for conveying the original received through said first original inlet port to a predetermined position and exhausting the original from the predetermined position;

original supporting means mounted on a housing of said document feeding apparatus and having an image designation device for designating a desired image area of the original;

a second original inlet port formed near said original supporting means; and a convey path for guiding the original received by said second original inlet port to said conveying means;

wherein the original is placed on said image area designation device, the desired image area is designated, and the original is guided to the predetermined position through said second original inlet port, said convey path, and said conveying means wherein said conveying means constitutes original pressing means which is freely opened/closed with respect to said housing, said original supporting means being arranged on said original pressing means and said original supporting means is formed on an upper surface of said original pressing means.

13. An apparatus according to claim 8, wherein the original is placed on said second original supporting means such that an image surface of the original faces up, said image surface being turned along said convey path and being guided to the reading position.

14. An apparatus according to claim 8, wherein original position alignment references on said second original supporting means are defined such that a first reference along an original feed direction coincides with a reference for causing said conveying means to convey the original and that a second reference perpendicular to the original feed direction is opposite to that at the reading predetermined position with respect to the original feed direction.

15. A document feeding apparatus comprising:

a first original inlet port for receiving an original;

conveying mean for conveying the original received through said first original inlet port to a predetermined position and exhausting the original from the predetermined position;

original supporting means mounted on a housing of said document feeding apparatus and having an image designation device for designating a desired image area of the original;

a second original inlet port formed near said original supporting means; and a convey path for guiding the original received by said second original inlet port to said conveying means;

wherein the original is placed on said image area designation device, the desired image area is designated, and the original is guided to the predetermined position through said second original inlet port, said convey path, and said conveying means wherein original position alignment references on said second original supporting means are defined such that a first reference along an original feed direction coincides with a reference for causing said conveying means to convey the original and that a second reference perpendicular to the original feed direction is opposite to that at the reading position with respect to the original feed direction and wherein the second reference is set at the side of the second inlet port of said second original supporting means.

16. An apparatus according to claim 14, wherein the reading predetermined position is a position on a platen glass of an image forming apparatus, and the original feed direction coincides with an original scanning direction of said image forming apparatus.

17. An apparatus according to claim 14, wherein the original exhausted by said conveying means is guided to said second original supporting means located at a position opposite the second reference position with respect to the original feed direction.

18. A document feeding apparatus comprising:

first original supporting means on which an original is placed;

an inlet port for receiving the original placed on said first original supporting means;

conveying means for conveying the original received by said inlet port to a predetermined position and exhausting the original from the predetermined position;

second original supporting means mounted on a housing of said document feeding apparatus and having an image area designation device for designating a desired image area of the original; and protecting means for covering said second original supporting means to protect said image area designation device which is openable to place the original on said image area designation device;

wherein after a desired image is designated the original is placed on said first original supporting means and is guided to the predetermined position through said inlet port.

19. An apparatus according to claim 18, wherein the original exhausted from the predetermined position is guided to said second original supporting means.

20. An apparatus according to claim 19, wherein said protecting means is closed after the desired image area is designated and serves as an exhaust table of the original guided to said second original supporting means.

21. An apparatus according to claim 20, wherein said protecting means has ribs on an original contact surface thereof, said ribs being parallel to the direction of sheet exhaust.

22. An apparatus according to claim 20, wherein part of said protecting means is constituted by an inclined surface.

23. A document feeding apparatus comprising:

a first original inlet port for receiving an conveying means for conveying the original received by said first original inlet port to a predetermined position and exhausting the original from the predetermined position;

original supporting means mounted on a housing of said document feeding apparatus and having an image area designation device for designating a desired image area of the original;

a second original inlet port formed on said original supporting means;

a convey path for guiding the original received by said second original inlet port to said conveying means; and protecting means for covering said original supporting means to protect said image area designation device;

wherein said protecting means is opened to place the original on said image area designating means, the desired image area is designated by said image area designating means, and the original is guided to the predetermined position through said second original inlet port, said convey path and said conveying means.

24. An apparatus according to claim 23, wherein the original exhausted from the predetermined position is guided to said original supporting means.

25. An apparatus according to claim 24, wherein said protecting means is closed after the desired image area is designated and serves as an exhaust table of the original guided to said original supporting means.

26. An apparatus according to claim 24, wherein said protecting means has ribs on an original contact surface thereof, said ribs being parallel to the direction of sheet exhaust.

27. An apparatus according to claim 24, wherein part of said protecting means is constituted by an inclined surface.

28. A document feeding apparatus comprising:

an original inlet port for receiving an original;

conveying means for conveying the original received by said original inlet port to a predetermined position and exhausting the original from the predetermined position;

original supporting means mounted on a housing of said document feeding apparatus and having an image area designation device for designating a desired image area of the original;

a first exhaust path for guiding the original exhausted from the predetermined position to said, original supporting means;

a second exhaust path for guiding the original exhausted from the predetermined position to a portion excluding said original supporting means; and switching means for guiding the original to said second exhaust path in an image area designation mode and to said first exhaust path in an image area nondesignation mode.

29. A document feeding apparatus comprising:

an original inlet port for receiving an original;

conveying means for conveying the original received by said original inlet port to a predetermined position and exhausting the original from the predetermined position;

original supporting means mounted on a housing of said document feeding apparatus and having an image area designation device for designating a desired image area of the original;

protecting means for covering said original supporting means to protect said image area designation device;

a first exhaust path for guiding the original exhausted from the predetermined position to said original supporting means;

a second exhaust path for guiding the original exhausted from the predetermined position to a portion excluding said original supporting means; and change-over means for guiding the original to said first exhaust path when said protecting means is closed and to said second exhaust path when said protecting means is open.

30. An apparatus according to claim 29, wherein said change-over means performs switching by being urged by said protecting means when said protecting means is opened.

31. An apparatus according to claim 30, wherein said protecting means is opened and moved to a position where said protecting means receives the original exhausted from said second exhaust path.

32. An apparatus according to claim 29, wherein said change-over means performs switching under electrical control when said protecting means is opened.

33. An apparatus according to claim 32, further comprising switching means operated in response to opening of said protecting means, and electromagnetic control means controlled by said switching means to actuate said change-over means.

34. An apparatus according to any one of claims 29 to 33, further comprising another original inlet port formed on said original supporting means, and a convey path for guiding the original from said another original inlet port to the predetermined position.

35. An apparatus according to claim 34, wherein said convey path serves to turn over the original, the turned original being guided to the predetermined position.

36. A document feeding apparatus comprising:

original supporting means for supporting an original;

an original inlet port for receiving the original from said original supporting means;

endless conveyor belt means for guiding the original received by said original inlet port to a predetermined position and exhausting the original from the predetermined position, said endless conveyor belt means being provided with a first parallel portion for exhausting the original from the predetermined position and a second parallel portion located above said first parallel portion; and an image area designation device arranged at the side of a lower surface of said second parallel portion of said endless conveyor belt means, the image area designation device being adapted to designate a desired image area of the original;

wherein in an image area designation mode, the original is placed on said second parallel portion and the desired image area is designated, and thereafter said conveyor belt means is driven to guide the original to the predetermined position.

37. An apparatus according to claim 36, wherein a reference position mark for original position alignment is formed on a surface of said second parallel portion.

38. An image forming apparatus comprising:

a document feeding apparatus including an image area designation device for designating a desired image area of an original and conveying means for conveying the original, whose desired image area is designated by said image area designation device, to a read position and thereafter exhausting the original from the read position;

image information forming means for forming image information of the original read at the read position onto a sheet; and sheet conveying means for conveying the sheet to said image information forming means;

wherein an original convey direction of said conveying means is perpendicular to a sheet convey direction of said sheet conveying means.

39. An apparatus according to claim 38, further comprising an original inlet port for receiving the original and feeding means for feeding the original received by said inlet port, and wherein in an image area designation mode, the original is placed on said image area designation device to designate a desired image area of the original, and the original is guided to the read position through said original inlet port and said feeding means.

40. An apparatus according to claim 38, further comprising an original inlet port formed at an end of said image area designation device, and a convey path for guiding the original received by said original inlet port to the read position, and wherein the original is placed on said image area designation device to designate a desired image area of the original and the original is guided to the read position through said original inlet port and said convey path.

* * * * *

UNITED STATES PATENT AND TRADEMARK OFFICE
CERTIFICATE OF CORRECTION

PATENT NO. : 4,829,341

DATED : May 9, 1989

INVENTOR(S) : NOBUKAZU SASAKI, ET AL.

It is certified that error appears in the above-identified patent and that said Letters Patent is hereby corrected as shown below:

COLUMN 2

Line 37, "original If" should read --original. If--.

COLUMN 5

Line 26, "panel The" should read --panel. The--.

COLUMN 6

Line 25, "interfered," should read --interfered with,--.

COLUMN 10

Line 17, "The The" should read --The--.

COLUMN 13

Line 45, "the" (first occurrence) should be deleted.

COLUMN 20

Line 26, "an" should be deleted.
Line 41, "position An" should read --position. An--.

COLUMN 21

Line 57, "FIG. 26" should read --FIG. 26B--.

UNITED STATES PATENT AND TRADEMARK OFFICE

CERTIFICATE OF CORRECTION

PATENT NO. : 4,829,341

DATED : May 9, 1989

INVENTOR(S) : NOBUKAZU SASAKI, ET AL.

It is certified that error appears in the above-identified patent and that said Letters Patent is hereby corrected as shown below:

COLUMN 22

Line 17, "and" should be deleted.
Line 23, "designation" (second occurrence) should read --designating--.
Line 29, "and" should be deleted.

COLUMN 23

Line 14, "means;" should read --means.--.
Line 44, "open/closed" should read --opened/closed--.

COLUMN 24

Line 10, "aparatus" should read --apparatus--.
Line 17, "predetermined" should be deleted.
Line 21, "conveying mean" should read --conveying means--.
Line 51, "predetermined" should be deleted.

COLUMN 25

Line 28, "an" should read --an original;--.

UNITED STATES PATENT AND TRADEMARK OFFICE

CERTIFICATE OF CORRECTION

PATENT NO. : 4,829,341

DATED : May 9, 1989

INVENTOR(S) : NOBUKAZU SASAKI, ET AL.

It is certified that error appears in the above-identified patent and that said Letters Patent is hereby corrected as shown below:

COLUMN 26

Line 10, "said," should read --said--.

Signed and Sealed this

Sixth Day of August, 1991

Attest:

HARRY F. MANBECK, JR.

*Attesting Officer*

*Commissioner of Patents and Trademarks*